US010848367B2

(12) United States Patent
Hao et al.

(10) Patent No.: US 10,848,367 B2
(45) Date of Patent: Nov. 24, 2020

(54) SPLICING CONCURRENT CONNECTIONS INTO A HIGH AVAILABILITY SESSION

(71) Applicant: Nokia Solutions and Networks Oy, Espoo (FI)

(72) Inventors: Fang Hao, Sunnyvale, CA (US); Hyunseok Chang, Sunnyvale, CA (US); Sarit Mukherjee, Sunnyvale, CA (US); Mostafa Uddin, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 83 days.

(21) Appl. No.: 16/117,535

(22) Filed: Aug. 30, 2018

(65) Prior Publication Data
US 2020/0076673 A1    Mar. 5, 2020

(51) Int. Cl.
*G06F 15/16*   (2006.01)
*H04L 12/24*   (2006.01)
*H04L 12/26*   (2006.01)
*H04L 12/741*  (2013.01)
*H04L 29/06*   (2006.01)

(52) U.S. Cl.
CPC ............ *H04L 41/046* (2013.01); *H04L 43/10* (2013.01); *H04L 45/74* (2013.01); *H04L 67/42* (2013.01); *H04L 69/16* (2013.01)

(58) Field of Classification Search
CPC ....... H04L 41/046; H04L 43/10; H04L 45/74; H04L 67/42; H04L 69/16
USPC ........................................................ 709/202
See application file for complete search history.

(56) References Cited

U.S. PATENT DOCUMENTS

| 5,898,841 | A  | * | 4/1999  | Higgins .................. H04L 1/0083 709/235 |
| 7,065,618 | B1 | * | 6/2006  | Ghemawat ............ H04L 67/1095 711/161 |
| 8,904,224 | B2 | * | 12/2014 | Kalyanaraman .... H04L 67/1095 714/4.11 |
| 9,100,323 | B1 | * | 8/2015  | Sindhu .................... H04L 45/16 |

(Continued)

OTHER PUBLICATIONS

Alvisi et al., "Wrapping Server-Side TCP to Mask Connection Failures", IEEE International Conference on Computer Communications (INFOCOM), Apr. 28, 2001, 9 pages.

(Continued)

*Primary Examiner* — Frantz B Jean

(57) ABSTRACT

A plurality of agents is instantiated on a corresponding plurality of servers that are running concurrent instances of a control plane application. A first agent is selected from the plurality of agents to mediate communication between a client and the concurrent instances of the control plane application running on the plurality of servers. The first agent replicates uplink packets received from the client for transmission to the plurality of agents. A first connection is used to convey the uplink packets. The first agent transmits a single copy of redundant downlink packets received from the plurality of agents to the client via the first connection. In some cases, the first connection is a stateful transmission control protocol (TCP) connection and the first agent replicates the uplink packets received in a single TCP stream. The first agent merges the redundant downlink packets into the single TCP stream.

32 Claims, 11 Drawing Sheets

(56) References Cited

U.S. PATENT DOCUMENTS

| | | | | |
|---|---|---|---|---|
| 2008/0109554 A1* | 5/2008 | Jing | ................... | H04L 12/14 |
| | | | | 709/230 |
| 2014/0112120 A1* | 4/2014 | Kim | ................ | H04N 21/643 |
| | | | | 370/216 |
| 2019/0089818 A1* | 3/2019 | Choi | ................ | H04L 69/161 |

OTHER PUBLICATIONS

Agapi et al., "Routers for the Cloud, Can the Internet Achieve 5-Nines Availability?", IEEE Internet Computing, vol. 15, Issue 5, Sep. 8, 2011, 6 pages.

Shao et al., "HARTs: High Availability Cluster Architecture with Redundant TCP Stacks", IEEE International Performance, Computing, and Communications Conference (IPCCC), Apr. 11, 2003, 8 pages.

Cisco TOS Technologies, High Availability, <https://www.cisco.com/c/en/us/products/ios-nx-os-software/high-availability/index.html>, Accessed Jun. 15, 2018, 3 pages.

U.S. Appl. No. 16/117,749, filed Aug. 30, 2018, listing Fang Hao et al. as inventors, entitled "Acknowledgment and Packet Retransmission for Spliced Streams".

Non-Final Office Action dated Dec. 10, 2019 for U.S. Appl. No. 16/117,749, 34 pages.

Final Office Action dated Mar. 30, 2020 for U.S. Appl. No. 16/117,749, 27 pages.

\* cited by examiner

SPLICING CONCURRENT CONNECTIONS INTO A HIGH AVAILABILITY SESSION

BACKGROUND

Communication systems rely on data networks to provide communication and computing services. Data networks divide the network into a data plane and a control plane. As used herein, the term "control plane" refers to a portion of a network architecture that defines the network topology, e.g., exchanging information to construct routing tables that determine how to route incoming packets to destination addresses. As used herein, the term "data plane" refers to the portion of the network architecture that determines how to forward packets that are arriving on an inbound interface. The data plane is also referred to as the forwarding plane or the user plane. The control plane is responsible for configuring and managing the data plane. The reliability and availability of data plane entities can be enhanced using techniques such as optical path creation and restoration to provide reliability below the Internet protocol (IP) layer, equal cost multipath (ECMP) routing to enable path redundancy in the IP layer, routers including line card and port redundancy to avoid network failures, and the like. Failure recovery techniques are used to enhance stateless transaction level reliability for general computing platforms used in distributed systems and cloud computing. For example, retry/redirect mechanisms can improve stateless transaction level reliability for operations such as accessing a webpage, a restful API call, a map operation, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
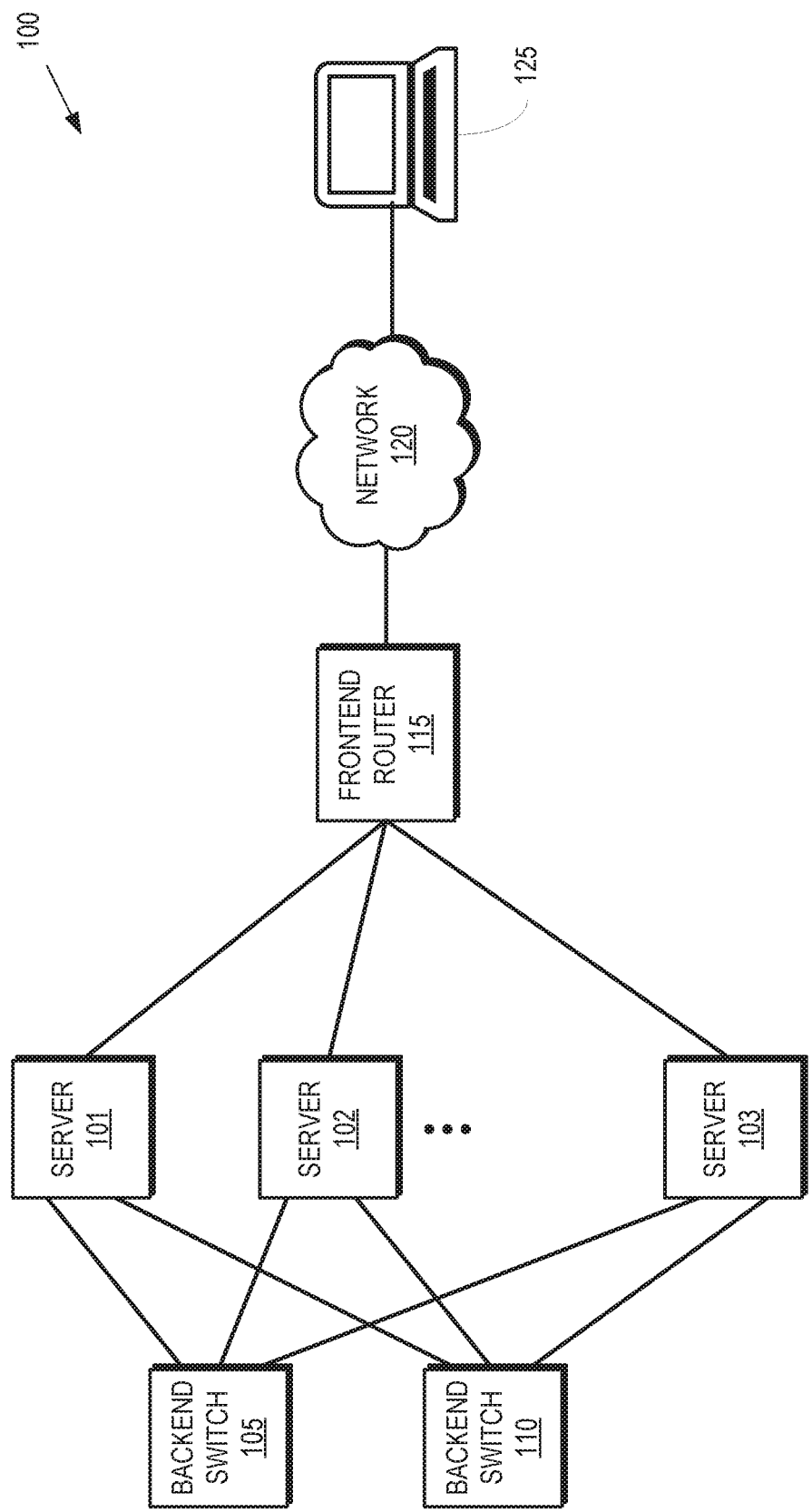
FIG. 1 is a block diagram of a communication system that supports high availability services according to some embodiments.

Conventional techniques for providing improved availability and reliability to stateless transactions in the data plane are not appropriate for enhancing the availability and reliability of control plane elements that implement stateful protocols such as the transmission control protocol (TCP). A network control plane framework should support stateful protocol level reliability that works at a level below the transactions. For example, the control plane should support uninterrupted TCP sessions, secure shell access, and the like. Availability of some protocol-specific control plane applications and software components is improved using entities such as border gateway protocol (BGP) daemons, root servers, middleboxes, and the like. However, these techniques only support availability and reliability at large time granularities such as seconds, which makes these approaches unsuitable for data plane applications that are required to reliably create and provision network services in real time. For example, on-demand network slices are expected to be provisioned and decommissioned in large numbers, new paths and traffic classifications are expected to be computed and introduced into the network dynamically, large numbers of packet processing rules are expected to be introduced and removed from routers in real time, and the like. Conventional data plane techniques and purpose-built control plane techniques therefore do not provide a control plane framework that is highly available and reliable for control plane applications in a protocol-agnostic fashion, recover from software or hardware failures with sub-second latency, provides secure access mechanisms across applications and network states, and support seamless version upgrades for applications with substantially zero downtime.

As discussed above, communication systems implement stateful protocols such as TCP to provide reliable transmission of packets between a client and one or more servers via the Internet. Web access, video streaming, email, and the like utilize TCP to connect a user client to one or more corresponding servers. Network control plane applications such as BGP also use TCP. However, TCP stack implementations are susceptible to single points of failure. The TCP stack includes a significant amount of data buffering and other dynamic connection state information, which makes it difficult to provide real-time backup and recovery for the dynamic state. Thus, the TCP stack can undermine the reliability and availability of a conventional network.

FIGS. 1-11 disclose embodiments of techniques and systems for supporting high availability and reliability of control plane applications at fine levels of temporal granularity by instantiating agents on a plurality of servers that are running concurrent instances of a control plane application. The agents are configured to handle packet replication, forwarding, and flow control. Packets received from a client are replicated to the plurality of servers. The concurrent instances process incoming packets received from the client and generate responses to the incoming packets. One of the response packets is selected for transmission to the client by a transport layer. Packets are transmitted from the servers to the client after all the servers have transmitted the packet.

Thus, the packet transmission rate is governed by the slowest server. In some embodiments, the response packets are combined into a single TCP stream that is terminated by the client. The agents monitor health statuses of the network and servers, as well as running a leader election algorithm to select a leader agent. The leader agent receives uplink packets from the client in a TCP stream and replicates uplink packets for transmission to the agents on the other servers. The leader agent also gathers downlink packets from agents on the other servers and transmits the downlink packets to the client in the TCP stream. Some embodiments of the leader agent exchange packets and other signaling with the other agents via one or more backend switches.

If the server becomes unavailable due to a hardware or software failure, the agents on the remaining active servers remove the failed server from an active server set. Other servers, including servers that previously failed, join the active set by requesting a copy of the control plane application via the leader agent. A process for the running control plane application is then cloned and migrated to the requesting server, which can then join the active set. In some embodiments, the requesting server transmits a request for a state of the control plane application process and then clones the control state application process based on the received state. Security information is synchronized between different servers to support secure communication.

Fault tolerance for a stateful connection such as a TCP connection between a client and a plurality of servers in an active set is improved by merging downlink packets received from the servers into a single TCP stream and replicating uplink packets received from the client in the TCP stream. This process is referred to as 1:N TCP splicing, where N is the number of servers in the active set. In some embodiments, a leader agent in one of the servers implements a flow control algorithm to perform packet distribution and splicing such as 1:N TCP splicing of uplink or downlink packets. The servers request retransmissions from the client in response to the server missing a packet and a server that transmits a data packet does not receive an acknowledgment from the client unless all the servers in the active set have transmitted the data packet. The flow control algorithm keeps track of the retransmission requests transmitted by the servers and ensures that a single stream of retransmission requests is sent to the client. For example, if two servers are receiving uplink packets from the client in a single TCP stream, both servers acknowledge receipt of the packets. The first server transmits a first duplicate ACK that includes a sequence number of a previously received data packet if the first server failed to receive a subsequent data packet. The first duplicate ACK is transmitted to the client. The second server subsequently transmits a second duplicate ACK that includes the sequence number of the previously received data packet in response to the second server failing to receive the subsequent data packet. The flow control algorithm does not transmit the second duplicate ACK because it is redundant with the first duplicate ACK. Thus, the client only receives a single retransmission request for a data packet that was not received by more than one of the servers. The flow control algorithm identifies retransmitted downlink data packets and removes redundant packets from multiple servers to ensure that a single retransmitted downlink data packet is received at the client. In some embodiments, stalled servers are identified based on timers associated with the servers.

FIG. 1 is a block diagram of a communication system 100 that supports high availability services according to some embodiments. The communication system 100 includes a cluster of servers 101, 102, 103, which are collectively referred to herein as "the servers 101-103." As discussed in detail below, each of the servers 101-103 includes an agent to support high availability services provided by instances of a control plane application that are concurrently running on the corresponding servers 101-103. The servers 101-103 are interconnected by one or more backend switches 105, 110 that provide pathways for conveying packets or signaling between the servers 101-103. Although the switches 105, 110 shown in FIG. 1 are connected to all of the servers 101-103, some embodiments of the switches 105, 110 are connected to different subsets of the servers 101-103 so that messages exchanged between some of the servers 101-103 travel along a pathway that includes more than one of the switches 105, 110.

One or more front-end routers 115 connect the servers 101-103 to a network 120 such as a local area network, wide area network, or the Internet. The servers 101-103 are therefore able to exchange uplink and downlink packets with a client 125 via the router 115 and the network 120. High availability of control plane applications executing on the servers 101-103 is provided by allowing the servers 101-103 to run concurrent instances of the control plane application to provide redundancy and reliability. The servers 101-103 share a virtual Internet protocol (IP) address that is known to the router 115 and advertised by the router 115 to the network 120. The servers 101-103 therefore appear to other entities connected to the network 120 as a single entity having the advertised virtual IP address. The servers 101-103 peer with the router 115 using protocols such as open shortest path first (OSPF), intermediate system to intermediate system (IS-IS), and the like that permit the servers 101-103 to advertise routing metrics to the router 115 and influence service selection for incoming traffic flows.

Figure 2:
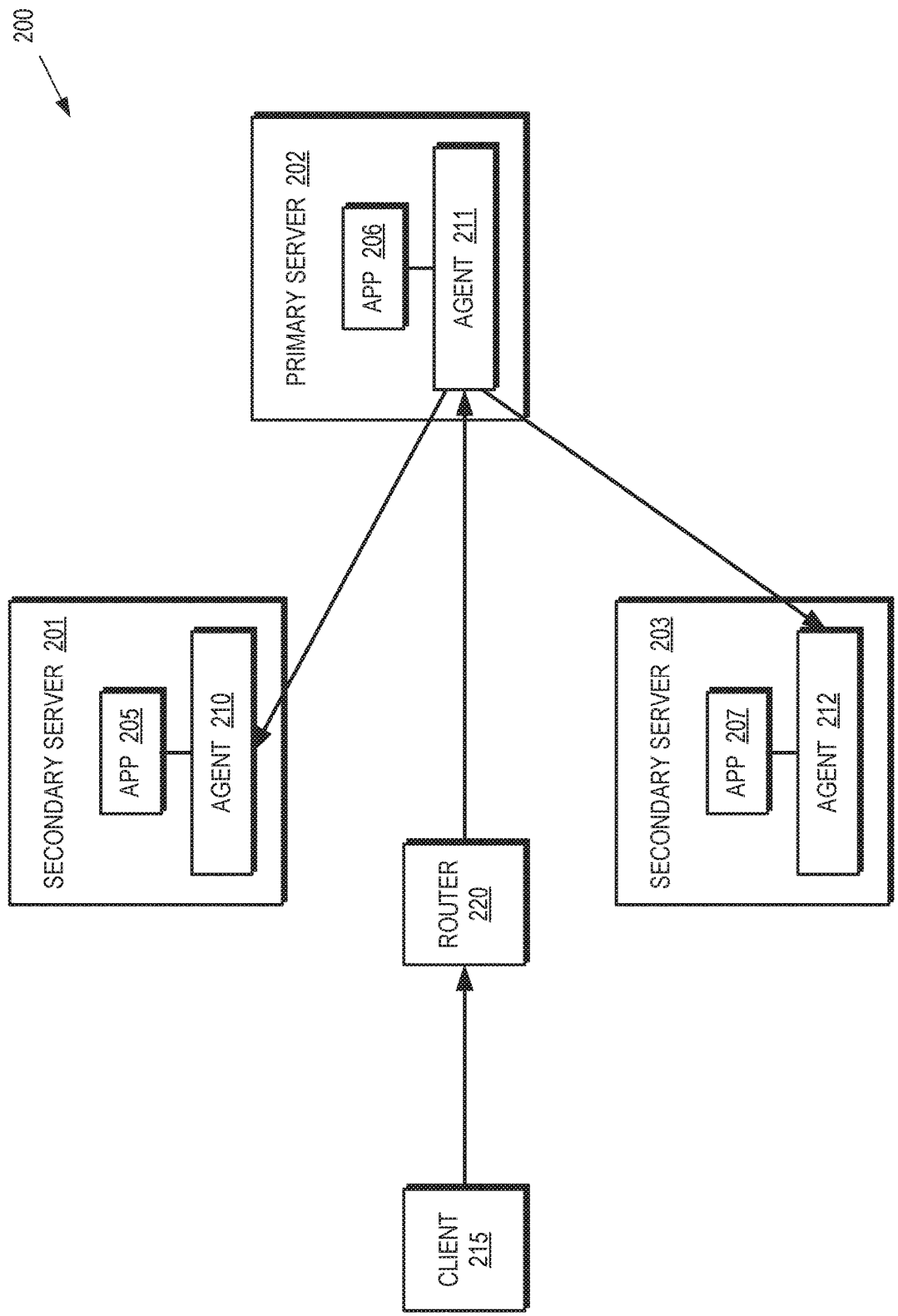
FIG. 2 is a block diagram of a first example of routing uplink or incoming packet flows in a communication system according to some embodiments.

FIG. 2 is a block diagram of a first example of routing uplink or incoming packet flows in a communication system 200 according to some embodiments. The communication system 200 includes multiple servers 201, 202, 203, which are collectively referred to herein as "the servers 201-203." In the illustrated embodiment, the server 202 is a primary server and the servers 201, 203 are secondary servers. Each of the servers 201-203 concurrently runs an instance 205, 206, 207 (collectively referred to herein as "the instances 205-207") of a control plane application. As discussed in detail below, a transport layer is used to synchronize between the instances 205-207. The running instances 205-207 process incoming packets and generate responses according to logic implemented in the control plane application. Only one response is selected by the transport layer for transmission.

The servers 201-203 also concurrently run agents 210, 211, 212, which are collectively referred to herein as "the agents 210-212." The agents 210-212 handle packet replication, forwarding, and flow control. In the illustrated embodiment, a client 215 transmits one or more packets to a router 220. The packets are addressed to a virtual IP address that is shared by the servers 201-203. The router 220 forwards the packets to the agent 211, which has been selected as a leader agent, as discussed in detail below. For example, the server 202 can advertise the smallest routing metric so that the router 220 forwards the packet flow to the server 202. The agent 211 on the receiving server 202 multicasts the incoming packets to the other servers 201, 203 in the cluster. The agent 211 also delivers the packets (or information contained in the packets) to the local application 206. The agents 210, 212 in the servers 201, 203, respectively, deliver the packets (or information contained in the packets) to their local applications 205, 207.

Figure 3:
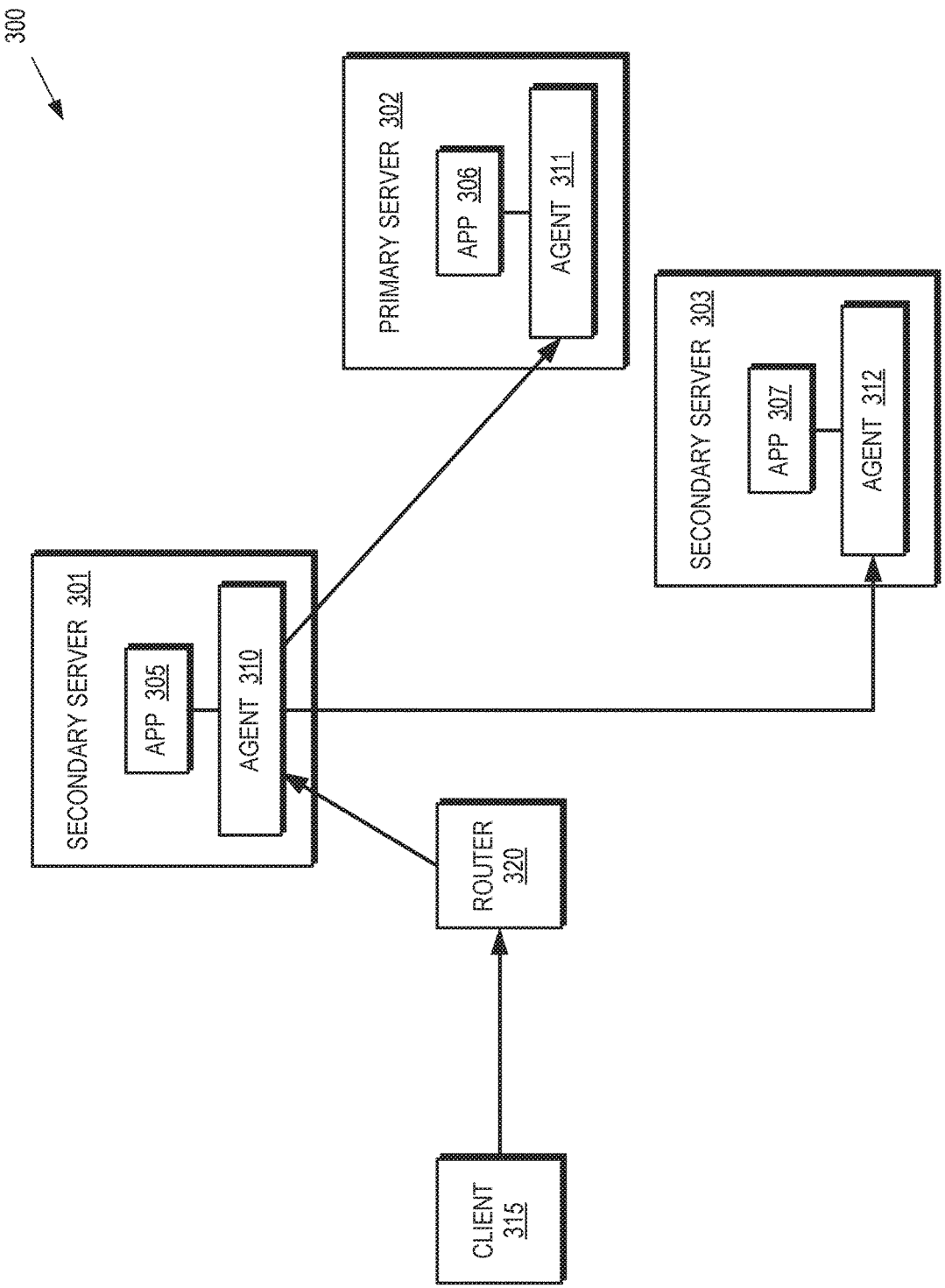
FIG. 3 is a block diagram of a second example of routing uplink or incoming packet flows in a communication system according to some embodiments.

FIG. 3 is a block diagram of a second example of routing uplink or incoming packet flows in a communication system 300 according to some embodiments. The communication system 300 includes multiple servers 301, 302, 303, which are collectively referred to herein as "the servers 301-303." In the illustrated embodiment, the server 302 is a primary server and the servers 301, 303 are secondary servers. Each of the servers 301-303 concurrently runs an instance 305, 306, 307 (collectively referred to herein as "the instances 305-307") of a control plane application. As discussed in detail below, a transport layer is used to synchronize between the instances 305-307. The running instances 305-307 process incoming packets and generate responses according to logic implemented in the control plane application. Only one response is selected by the transport layer for transmission.

The servers 301-303 also concurrently run agents 310, 311, 312, which are collectively referred to herein as "the agents 310-312." The agents 310-312 handle packet replication, forwarding, and flow control. A client 315 transmits one or more packets to a router 320. The packets are addressed to a virtual IP address that is shared by the servers 301-303. In the illustrated embodiment, the servers 301-303 advertise the same (or substantially the same) routing metric. The router 320 therefore forwards the packets to the agent 310 on the secondary server 301, which forwards or distributes the packets according to a protocol such as ECMP. The agent 310 on the receiving server 301 multicasts the incoming packets to the other servers 302, 303 in the cluster. The agent 310 also delivers the packets (or information contained in the packets) to the local application 305. The agents 311, 312 in the servers 302, 303, respectively, deliver the packets (or information contained in the packets) to their local applications 305, 307.

Figure 4:
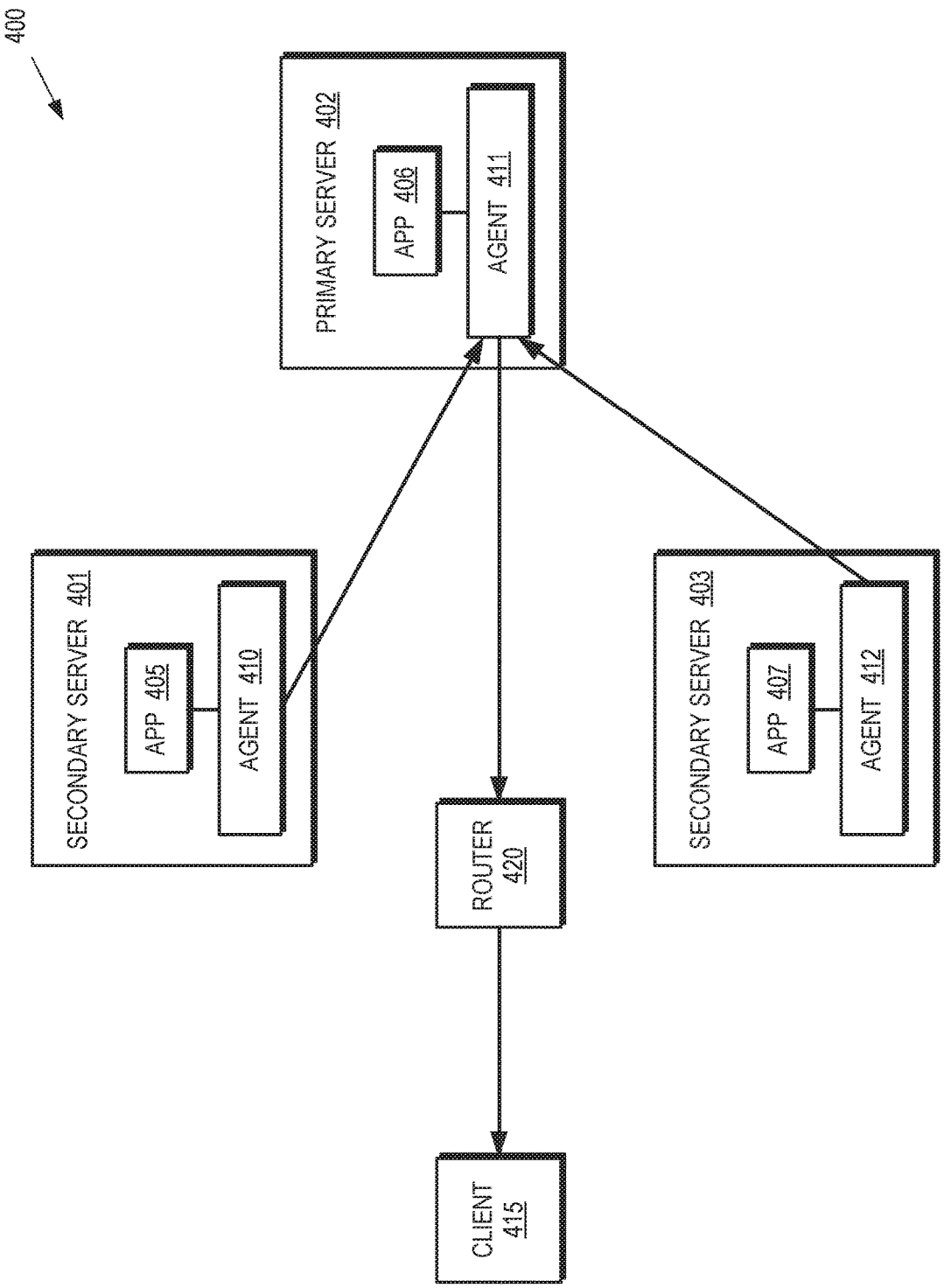
FIG. 4 is a block diagram of routing downlink or outgoing packet flows in a communication system according to some embodiments.

FIG. 4 is a block diagram of routing downlink or outgoing packet flows in a communication system 400 according to some embodiments. The communication system 400 includes multiple servers 401, 402, 403, which are collectively referred to herein as "the servers 401-403." In the illustrated embodiment, the server 402 is a primary server and the servers 401, 403 are secondary servers. Each of the servers 401-403 concurrently runs an instance 405, 406, 407 (collectively referred to herein as "the instances 405-407") of a control plane application. As discussed in detail below, a transport layer is used to synchronize between the instances 405-407. The running instances 405-407 process incoming packets and generate responses according to logic implemented in the control plane application. The servers 401-403 also concurrently run agents 410, 411, 412, which are collectively referred to herein as "the agents 410-412" and handle packet replication, forwarding, and flow control.

The instances 405-407 of the control plane application generate outgoing downlink packets for transmission to a client 415. The packets generated by the instances 405-407 are intercepted by the corresponding agents 410-412, which forward the packets to the primary server 402. The agent 411 executing on the primary server 402 merges the packet streams from the instances 405-407 to form an outgoing downlink stream of packets that includes one copy of the redundant packets provided by the instances 405-407. In some embodiments, the stream is a transmission control protocol (TCP) stream and the agent 411 performs 1:N TCP splicing to ensure that only one copy of each of the packets is forwarded to the client 415. The agent 411 also synchronizes the TCP sessions across the servers 401-403 with the client 415. Some embodiments of 1:N TCP splicing are discussed in detail below. The merged stream of packets is then forwarded to a router 420 for routing to the client 415.

Figure 5:
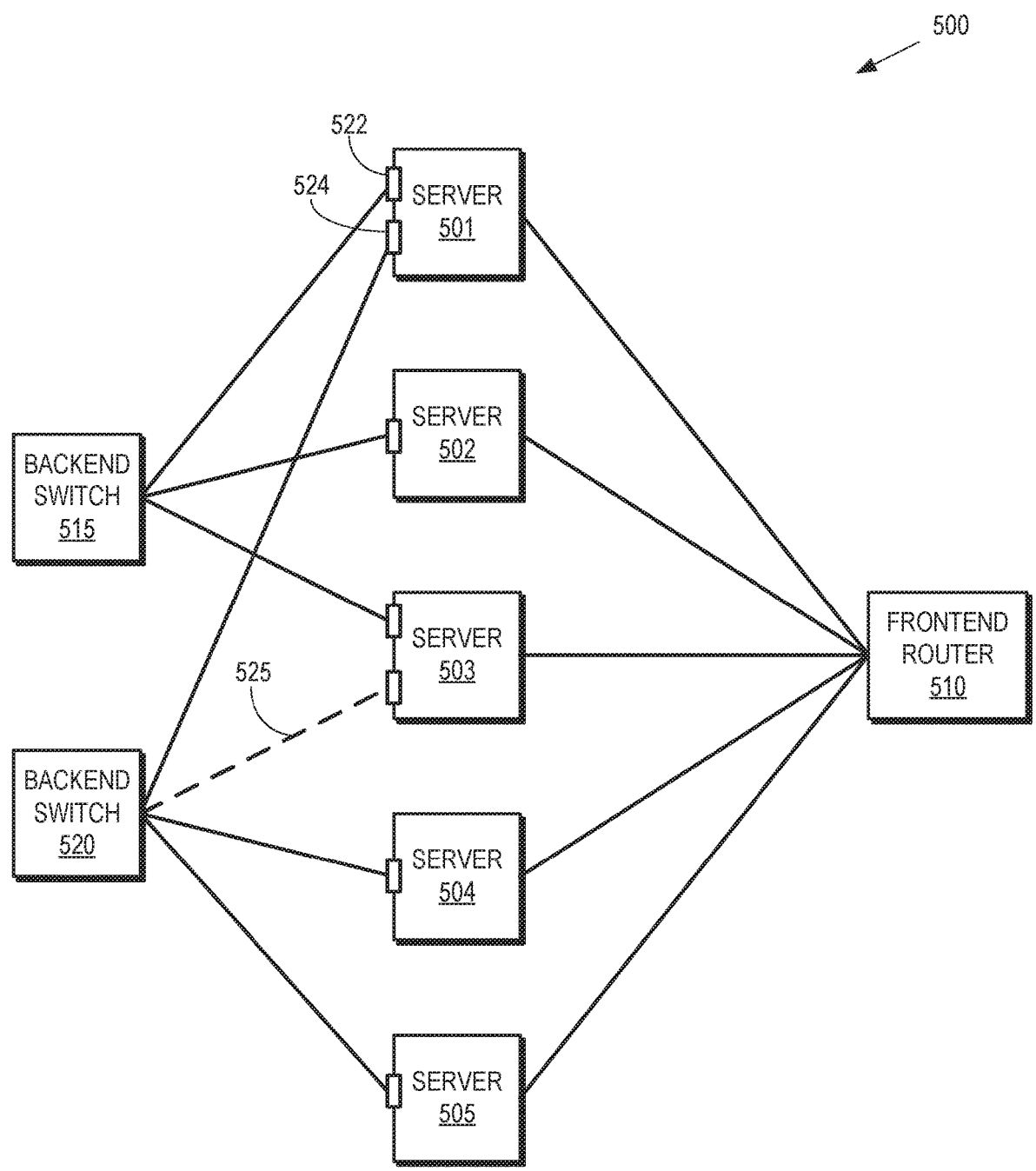
FIG. 5 is a block diagram of a communication system that is not partitioned by a failed backend connection according to some embodiments.

FIG. 5 is a block diagram of a communication system 500 that is not partitioned by a failed backend connection according to some embodiments. The communication system includes a cluster of servers 501, 502, 503, 504, 505, which are collectively referred to herein as "the servers 501-505." As discussed herein, each of the servers 501-505 includes an agent to support high availability services provided by instances of a control plane application that are concurrently running on the corresponding servers 501-505. The servers 501-505 exchange packets and signaling with a router 510 via corresponding connections. For example, concurrent instances of the control plane application are used to transmit copies of downlink packets to the router 510 and received copies of uplink packets from the router 510.

The servers 501-505 are interconnected by one or more backend switches 515, 520 that provide pathways for conveying packets or signaling between the servers 501-505. The servers 501-505 maintain different interfaces for the backend switch 515 and the backend switch 520. For example, the server 501 includes an interface 522 for a connection to the backend switch 515 and an interface 524 for the connection to the backend switch 520. The backend switch 515 maintains connections with the servers 501-503 and the backend switch 520 maintains connections with the servers 501, 503, 504, 505. The servers 501-505 in the cluster are therefore able to exchange packets or signaling with all of the other servers 501-505 in the cluster. For example, the server 501 communicates with the server 502 via the switch 515. In some cases, interconnections between the servers 501-505 include other servers 501-505 and one or more of the backend switches 515, 520. For example, the server 502 communicates with the server 504 via a pathway that includes the switch 515, the server 503, and the switch 520.

Agents (not shown in the interest of clarity in FIG. 5) implemented on the servers 501-505 use heartbeat messages to monitor the status of other servers 501-505 in the cluster. Heartbeat messages are broadcast over the available interfaces (e.g., the interfaces 522, 524 at the agent 501) to the backend switches 515, 520. All of the servers 501-505 should receive heartbeat messages from all the other servers 501-505 on the backplane network that includes the backend switches 515, 520. The servers 501-505 run individual timers for each of the other servers 501-505 so that the servers 501-505 can independently determine whether other servers are or are not reachable on the backplane network based on expiration of the timer associated with a server before a subsequent heartbeat message is received from the server.

Some embodiments of the heartbeat messages also carry explicit reachability information that indicates which of the servers 501-505 are reachable via the different backplane networks associated with the backend switches 515, 520. For example, heartbeat messages transmitted by the servers 501-503 coupled to the backend switch 515 can also carry reachability information that indicates that the servers 504, 505 are reachable via the backend switch 520. Including the reachability information allows a server that is only connected to one of the backend switches 515, 520 to infer the presence of other servers that are reachable via the other one of the backend switches 515, 520. For example, the server 505 is only connected to the backend switch 520 and therefore relies on reachability information associated with the backend switch 515 to detect the presence of the server 502.

The servers 501-505 gather reachability information based on the set of local timers and the explicit announcements (e.g., the heartbeat messages) provided by the other servers 501-505 via the backend switches 515, 520. Each of the servers consolidates the reachability information to infer the status of the network. In the illustrated embodiment, the servers 501-505 apply an "OR" operation so that a server is considered reachable on a backplane network if at least one of the information sources indicates that the server is reachable. For example, the server 501 considers the server 505 reachable if the timer maintained by the server 501 for the server 505 has not expired or if a heartbeat message received by the server 501 includes reachability information indicating that the server 505 is reachable. This procedure guarantees that the servers 501-505 converge to the same view of the network, e.g., the same list of reachable servers in the networks associated with the backend switches 515, 520, as long as the network is not partitioned.

The backend network including the switches 515, 520 includes redundant pathways and so failure in one or more of the connections does not prevent some of the servers 501-505 from communicating with other ones of the servers 501-505. In the illustrated embodiment, failure of the connection 525 does not cause a partitioning event that partitions the cluster into disconnected subsets of the servers 501-505. For example, the server 502 communicates with the servers 504, 505 via a pathway that includes the switch 515, the server 501, and the switch 520.

In some embodiments, the agents run a local leader election algorithm to select a primary server from among the servers 501-505 based on resource availability, e.g., based on a number of active backend interfaces, a router interface status, and application service status, a number of active neighbor servers, and the like. The servers 501-505 therefore converge to the same view of the network status and converge to the same choice of primary server. This approach saves multiple rounds of message exchange that are performed in conventional global leader election algorithms that require that the servers 501-505 exchange messages to converge to the final selection of a leader.

The local leader election algorithm assigns metrics to the servers 501-505. For example, each of the servers 501-505 can be assigned the following metric:
1. Router interface status: 1 if the peering with router 510 is alive; 0 otherwise.
2. Service status: 1 if the service (i.e. the corresponding control plane application) is up; 0 otherwise.
3. Number of neighbors this server can reach.
4. Number of backplane interface ports of the server that are up.
5. Static tie-breaking index (such as a rank identifier).

The servers 501-505 are sorted using the above combined metric in order, then the server with highest metric is selected as the leader. Metric 1 ensures that the leader server can receive incoming packets and send outgoing packet from/to the router 510. Metric 2 ensures that the leader server runs a valid service. Metrics 3 and 4 ensure that the leader server has the best connectivity to other servers 501-505. Metric 5 is a tie-breaking rule for the case where multiple servers 501-505 are equally qualified based on metrics 1-4. In some embodiments, different tie-breaking rules are assigned for different services. In this way, different services can elect different leaders, which is potentially better for load balancing. The leader election algorithm is run by the servers 501-505 whenever the network graph changes due to server or link status change. When link failure or server failure occurs, if the network remains connected, then the leader election algorithm guarantees that the leader can reach every other server that is alive.

Figure 6:
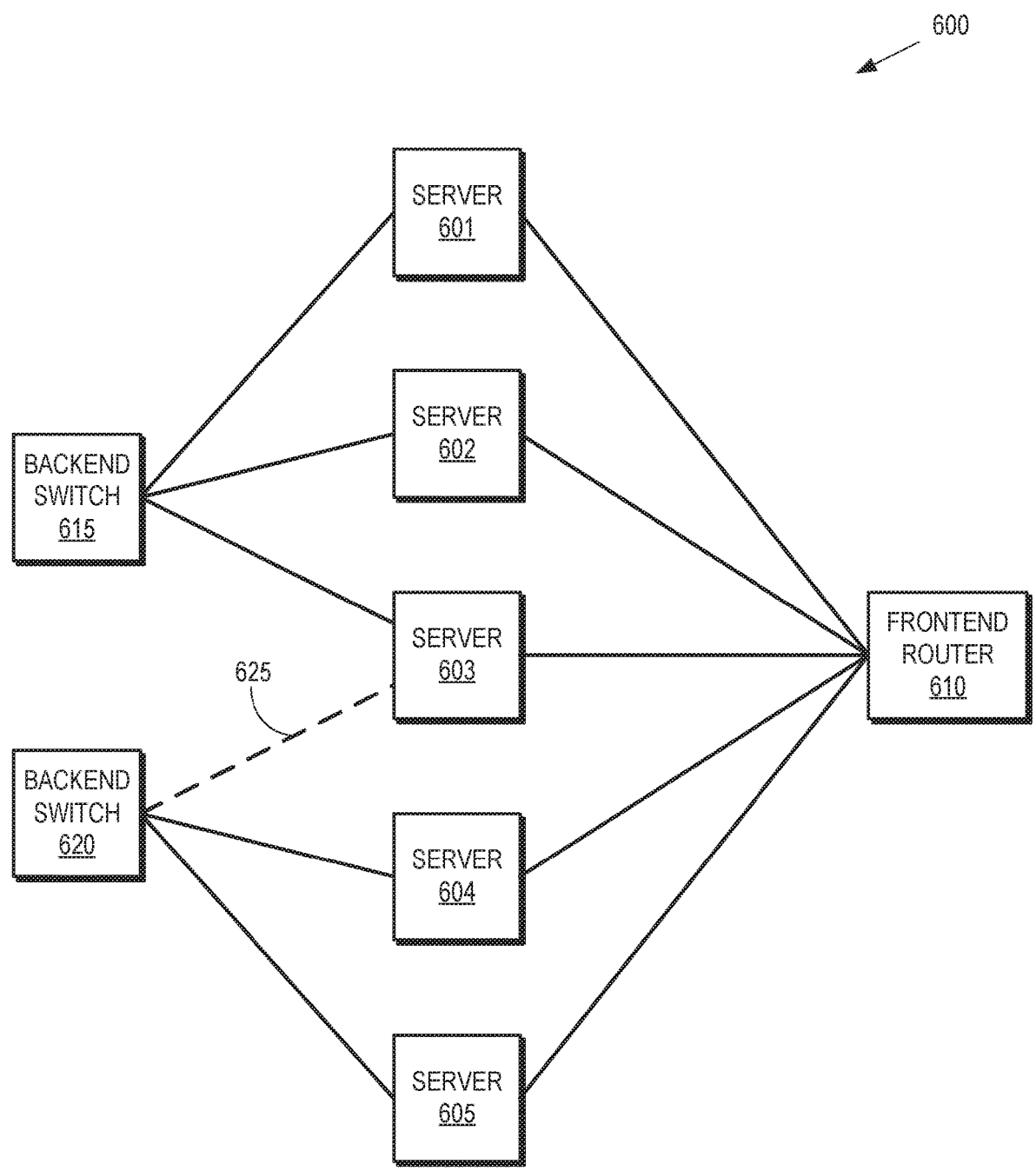
FIG. 6 is a block diagram of a communication system that is partitioned by a failed backend connection according to some embodiments.

FIG. 6 is a block diagram of a communication system 600 that is partitioned by a failed backend connection according to some embodiments. The communication system 600 includes a cluster of servers 601, 602, 603, 604, 605, which are collectively referred to herein as "the servers 601-605." As discussed herein, each of the servers 601-605 includes an agent to support high availability services provided by instances of a control plane application that are concurrently running on the corresponding servers 601-605. The servers 601-605 exchange packets and signaling with a router 610 via corresponding connections. The servers 601-605 are interconnected by one or more backend switches 615, 620 that provide pathways for conveying packets or signaling between the servers 601-605.

A partitioning event occurs when the connection 625 fails so that the server 603 is unable to communicate with the switch 620. The servers 601-605 detect partitioning of the cluster into a first subset including the servers 601-603 and a second subset including the servers 604, 605. In the illustrated embodiment, the servers 601-605 detects the partitioning event by maintaining a list identifying a set of nodes that are alive on the networks associated with the backend switches 615, 620. A partitioning event is identified in response to a failure event causing the set for a network to change from non-empty to empty and the lost servers also not being reachable on another network. For example, before the failure of the connection 625, the node set for the network associated with the backend switch 615 includes the servers 601-603 and the node set for the network associated with the backend switch 620 include the servers 603-605. After failure of the connection 625, the node set for the network associated with the backend switch 615 still includes the servers 601-603 and the node set for the network associated with the backend switch 620 changes to include only the servers 604, 605. Both node sets are therefore disjoint sets after failure of the connection 625, which indicates that a partitioning event has occurred because none of the nodes from the set associated with the backend switch 615 can reach any of the nodes associated with the backend switch 620. The servers 601-603 are unable to receive heartbeat messages from the servers 604, 605 and therefore conclude that the set of nodes associated with the backend switch 620 is empty. The servers 604, 605 are unable to receive heartbeat messages from the servers 601-603 and therefore conclude that the set of nodes associated with the backend switch 615 is empty.

Pseudocode for detecting partitioning events that partition a cluster into a blue group (e.g., the nodes associated with the backend switch 615) and a red group (e.g., the nodes associated with the backend switch 620) is presented below:

Required:

n_red_prev ← previous number of server nodes in the red network group
n_red ← number of server nodes in the red network group
n_blue_prev ← previous number of server nodes in the blue network group
n_blue ← number of server nodes in the blue network group Condition for Partitioning Event:

```
If (n_red==0 && n_red_prev>=1 && n_blue_prev>=1) ||
    (n_blue==0 && n_red_prev>=1 && n_blue_prev>=1)
    Partition_occured ← true
Endif
```

In response to detecting partitioning of the cluster, the servers 601-605 each independently execute an algorithm to determine which partition is selected as the primary partition. The servers in the primary partition remain alive to provide services to the client via the router 610. Some embodiments of the servers 601-605 execute a partition selection algorithm that selects a subset of the cluster including the servers 601-605 (e.g., the blue group associated with the backend switch 615 or the red group associated with the backend switch 620) as the primary partition based on metrics associated with the servers and the partitions. For example, the primary partition can be selected as the group of servers that has a leader server with a higher router metric compared to the router metric of a leader server in the other group.

Some embodiments of the primary selection algorithm implemented front-end interface probing, which is designed for embodiments in which the front-end interface of each server can be probed from the other servers 601-605, e.g., via the router 610. Once the servers 601-605 are partitioned, the servers in the partitioned subsets (e.g., the subset including the servers 601-603 and the subset including the servers 604, 605) independently run a leader election algorithm to choose leaders for the partitioned subsets. The leaders of the subsets then probe possible servers in other networks through the front-end interfaces to confirm the partition and detect the status of the other servers. The probe messages contain information identifying the leader and associated routing metric information about the servers available in the subset that includes the leader. Servers in the other subset respond with a probe response message if the servers in the other subset are alive and their front-end interface is up and running. The probe response message contains information identifying the leader of the other subset and associated routing metric information for the servers in the other subset.

In the illustrated embodiment, the server 601 is selected as the leader for the blue group associated with the backend switch 615. The server 601 therefore transmits packets on its front-end interface to probe the corresponding front-end interfaces of the servers 604, 605 in the red group associated with the backend switch 620. The probe can result in one of the following outcomes:

The server 601 receives a response from the servers 604, 605. In this case, the two partitions know the status of the other partition and the partition that has a leader with a higher metric value becomes the primary partition.

The server 601 does not receive a reply from either of the servers 604, 605 and the server 601 maintains its peering relationship with the router 610. In this case, the server 601 concludes that either the servers 604, 605 lost their peering relationship with the router 610 or the servers 604, 605 are down. In either case, the servers 604, 605 cannot form a valid partition and the partition including the server 601 becomes the primary partition.

The server 601 does not receive a reply from either of the servers 604, 605 and the server 601 has lost its peering relationship with the router 610. In this case, the server 601 cannot be out of a valid primary partition and so the partition associated with the server 601 is shut down.

The leader server 604 for the subset including the servers 604, 605 uses the same algorithm to determine which partition should remain alive.

Pseudocode for the front-end probing algorithm implemented at the servers 601-605 follows:

Required:

```
N ← this server node
U ← Set of all server nodes
S ← Set of nodes of the sub-network group where this server node
belongs
O ← U\S
```

Procedure:

```
L ← the leader server in S chosen by the leader selection algorithm
If L==N then
    If N's router interface is up
        For each member t in O
            Send probe message to t
        Endfor
        Wait for the probe response from at least one member of O
        If no probe response
            S is the primary partition group with L as the leader
        Else
            K ← leader server in O as indicated by the probe
            response
                If L.metric > K.metric
                    S is the primary partition with L as the leader
                Else
                    O is the primary partition with K as the
                    leader, shutdown
                Endif
        Endif
    Else // N's router interface is down
        S cannot be a primary partition group, shutdown
    Endif
Else // N is not the leader
    Wait for probe message
    If probe message received
        Reply with probe response
        K ← extract primary node ID of O from probe message
        If L.metric > K.metric
            S is the primary partition with L as the leader
        Else
            O is the primary partition with K as the leader,
            shutdown
        Endif
    Else // Timeout for probe message: either N's router interface is
    down or O doesn't have a qualified leader
        If heartbeat message from L timeout
            Shutdown // no leader available for S after partitioning
        Endif
    Endif
Endif
```

Some embodiments of the servers 601-605 use a simple majority to select the partition to provide services to the client. For example, if front-end probing is not possible due to implementation constraints, the servers 601-605 select the partition that includes a majority of the servers 601-605. For example, if the network originally contained n servers, the partition that includes at least n/2+1 servers becomes the primary partition. Pseudocode for the simple majority algorithm implemented at the servers 601-605 follows:

Required:

```
N ← this server node
U ← Set of all server nodes
S ← Set of nodes of the sub-network group where this server node
belongs
```

Procedure:

```
If (size(S) >= size(U)/2 + 1)
    N is in primary set
Else
    N is not in primary set, shutdown
Endif
```

In the illustrated embodiment, the original network size is five. After partitioning, the subset including the servers 601-603 has a size of three and therefore becomes the primary partition. This approach is straightforward to implement and guarantees that a subset is selected as the primary partition if there is a subset that includes a majority of the active servers 601-605 after partition. However, if the network includes an even number of nodes, then two partitions could have the same size and none of the networks will be selected as the primary partition, which can cause all of the subsets to shut down. Furthermore, multiple partitions having the same size can result if the network includes an odd number of servers and a server failure causes partitioning.

Some embodiments of the servers 601-605 implement a near majority algorithm to address the aforementioned drawbacks in the simple majority algorithm. In the near majority algorithm, the servers 601-605 assume that a server failure causes the partitioning event whenever a failure occurs even if the partitioning event is caused by a link failure. Thus, when a server loses a connection, the servers in the same subset determine which subset should be the primary partition under the assumption that the server failed. The subset with the larger size is selected as the primary partition. If multiple subsets of the same size, then the subset that has the higher metric value for its leader becomes the primary partition.

In the illustrated embodiment, the servers 601, 602 recognize that the server 603 is still sending heartbeat messages but the connection 625 is down. The servers 601, 602 also stop receiving announcements about the subset associated with the backend switch 620, e.g., the servers 603, 604, 605. The servers 601, 602 execute the near majority algorithm by assuming that the server 603 has failed. In the illustrated embodiment, the servers 601, 602 choose their own subset as the primary partition in response to determining that the routing metrics for the leader server 601 are larger than the routing metrics for the leader server 604 of the other subset including the servers 604, 605. The servers 604, 605 in the other partition also stop receiving heartbeats from the server 603 and therefore also perform the near majority algorithm. The assumption that the node 603 has failed is used to eliminate ambiguity within the near majority algorithm. However, once a primary partition has been determined, the server 603 can still be included as a valid server in the primary partition if it is within the primary partition.

Pseudocode for the near majority algorithm implemented at the servers 601-605 follows:

Required:

```
N ← this server node
B ← Blue network (set of nodes with blue interface up) after partition
B' ← Blue network (set of nodes with blue interface up) before partition
R ← Red network (set of nodes with red interface up) after partition
R' ← Blue network (set of nodes with red interface up) before partition
```

Procedure:

```
If N∈B
    // after partitioning, N cannot hear from nodes in R, so need
    to infer R
    R ← R'\(B' ∩ R')    // (B' ∩ R') is the common node
between B' and R', where failure occurred
    B ← B\( B' ∩ R')
    K ← leader sever node from B
    L ← leader server node from R
    If L.metric > K.metric
        Shutdown
    endif
Else
    // after partitioning, N cannot hear from nodes in B, so need to
    infer B
        B ← B'\(B' ∩ R')
    R ← R\( B' ∩ R')
    K ← leader sever node from B
    L ← leader server node from R
    If L.metric < K.metric
        Shutdown
    endif
endif
```

Figure 7:
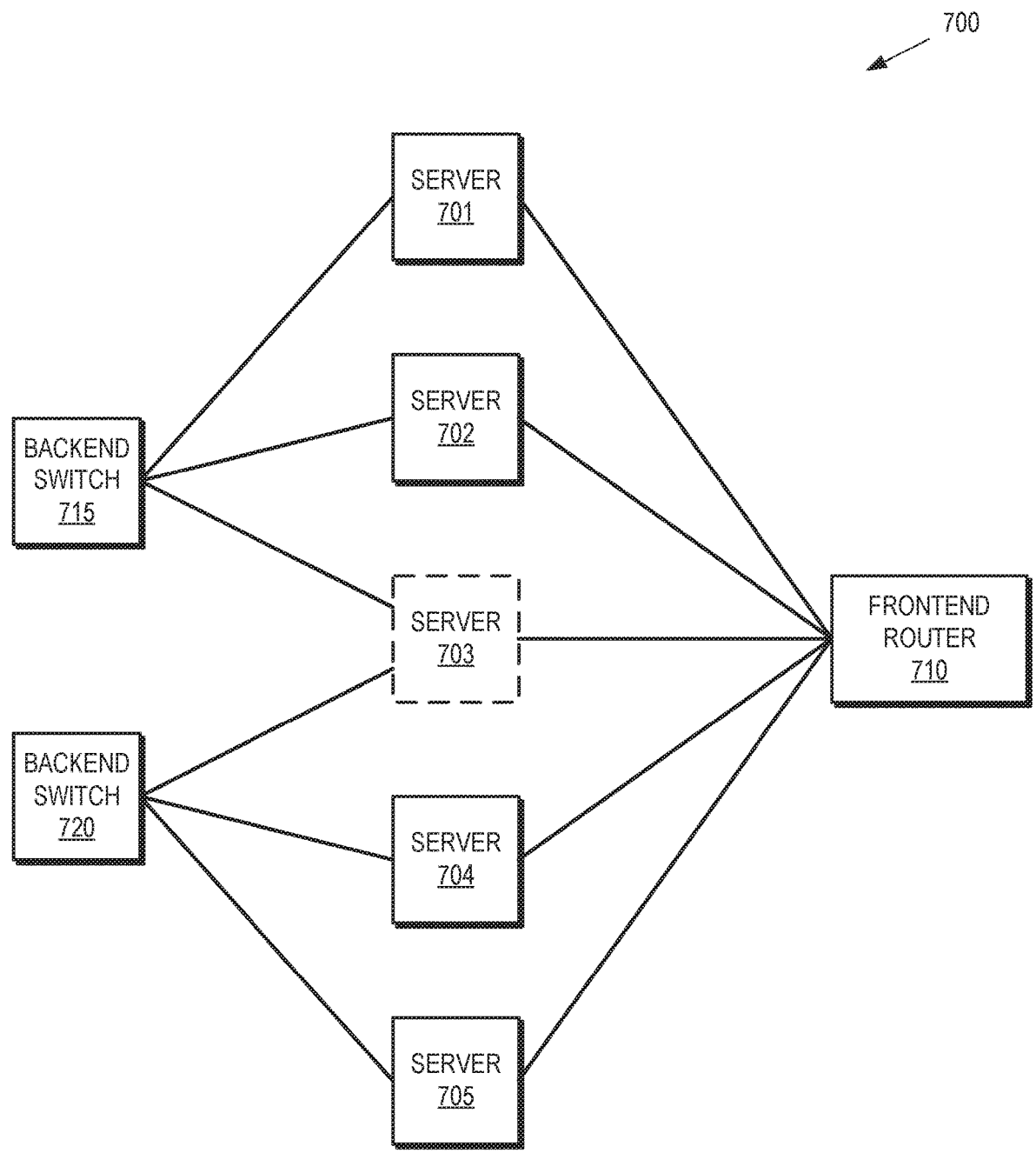
FIG. 7 is a block diagram of a communication system that is partitioned by a failed server according to some embodiments.

FIG. 7 is a block diagram of a communication system 700 that is partitioned by a failed server according to some embodiments. The communication system includes a cluster of servers 701, 702, 703, 704, 705, which are collectively referred to herein as "the servers 701-705." As discussed herein, each of the servers 701-705 includes an agent to support high availability services provided by instances of a control plane application that are concurrently running on the corresponding servers 701-705. The servers 701-705 exchange packets and signaling with a router 710 via corresponding connections. The servers 701-705 are interconnected by one or more backend switches 715, 720 that provide pathways for conveying packets or signaling between the servers 701-705.

In the illustrated embodiment, the server 703 has failed (as indicated by the dotted lines) leading to a partitioning event that creates partitions including the subset including the servers 701, 702 and the subset including the servers 704, 705. Both partitions include the same number of servers and so the active servers 701, 702, 704, 705 use a near majority algorithm to select the primary partition. In the illustrated embodiment, the server 701 is selected as the leader for its subset and the routing metric values for the server 701 are larger than the routing metric values for the server 704, which is selected as a leader for its subset. The partition including the servers 701, 702 is therefore chosen as the primary partition based on the comparison of the routing metric for the leader server 701 and the leader server 704.

The server 703 can rejoin the cluster in response to recovering from the failure. In response to recovering, an agent on the server 703 is initiated and begins sending and receiving heartbeat messages. The server 703 identifies the current primary server in the cluster based on the heartbeat messages and requests a state of the control plane application process from the primary server because the server 703 does not have the current running state of the control plane application. The primary server generates a local copy of the state of the control plane application process and transfers the state to the server 703, which restores (i.e., clones) the local version of the control plane application using the received state and joins the cluster as an active server. The server 703 can become either a secondary server or the new primary server depending on its resource status.

Some embodiments of the communication systems 100, 200, 300, 400, 500, 600, 700 illustrated in FIGS. 1-7 accommodate multiple versions of the control plane application running on different servers in the systems. However, the data sent from different instances running on the servers should be identical so that one server can be replaced by another seamlessly. Data across the servers can become different, e.g., due to software bugs or unexpected server hardware conditions, in which case a voting mechanism is used so that the copy shared by the majority of active servers is sent to the client. Output from the violating server is ignored. Some embodiments of the architectures illustrated in FIGS. 1-7 accommodate different versions of operating systems as long as they support the basic functions used to implement the techniques disclosed herein. Different instances of the control plane application should also be able to access the same files and contents on different servers. When a server recovers from a failure, some files accessed by the control plane application may be outdated. Corresponding files should therefore be copied from the primary server to the recovering server as part of the application cloning and copying procedure.

The architecture should also ensure consistency across secure sessions with the servers in a cluster that are running the same control plane application. For secure sessions such as secure shell (SSH) and secure socket layer/transport layer security (SSL/TLS), servers within the same cluster should send the same data content. The security keys and other random information should also be consistent across servers. For example, servers that implement SSH use the following random state:

Each SSH transport session is encrypted by a unique session key, which uses a "nonce", based on a random number.
A "cookie", which is part of server id, based on random numbers.
Data padding for each packet.

When two servers share the same random number sequence for each session, the above data fields will be the same, causing the encrypted packet they send out to be the same. Each active connection should therefore have a separate random number sequence so that there is no mixing across connections and each connection should acquire the same seed for its random number sequence. This can be done in one of the following ways:

Centralized Approach: A central random number generator (RNG) server generates random numbers. This can be implemented as an additional module of agents implemented in the servers. Note that only the RNG server at the leader node will be active. Each SSH app instance queries the central RNG server whenever it needs a new random number. Central RNG server uses a different sequence of random numbers for different connections, and remembers the seed for this sequence, so that this sequence can be reproduced if needed (e.g. during failure recovery). This solution is conceptually simple but may be slow since each SSH app needs to query RNG server for each packet.

Distributed Approach: Each SSH server instance generates its own random numbers independently. Each server maintains a table of RNGs, where each entry in the table has two fields: 1) Seed of this RNG; and 2) Current state of this RNG (state updated when a new number is generated). Then each connection is hashed into one entry in the table, using that RNG. The table should be big enough (say, millions of entries) so that chance for concurrent connections to collide on the same entry is extremely rare. The seed is updated (using current RNG value) when a new connection arrives. Since seed is preserved, this random number sequence can be reproduced if needed (when the connection is still alive). This approach is fast and does not incur any extra overhead. However, if concurrent connections arrive at the same time and collide into same RNG entry, their random numbers may be different across servers, causing encrypted data to be potentially different.

Hybrid Approach: Use centralized RNG server to generate the RNG seed for each new connection. Each SSH server instance maintains its own RNG table for all their connections; one entry per connection. When a new connection arrives, each SSH server queries the central RNG server to get the seed and generates its RNG locally using the acquired seed. Each server maintains RNG state separately for each connection. RNG seed for each connection is kept at central server during life time of this connection, so this RNG sequence can be reproduced if needed. This approach avoids the drawback of the previous two approaches, at the cost of slight increase in implementation complexity.

Similar solutions are applied to SSL sessions. In SSL, one difference is that during key negotiation, the client and server use system time in addition to the random bytes. Hence in addition to supporting consistent random number generation, the time stamps for each session should be consistent across servers. This can be supported by acquiring time from a central server. The barrier message can be used to enforce consistent timestamps. In this approach, the primary server periodically multicasts barrier messages to all servers that contains a timestamp, so that all servers can use the same timestamp for their SSL sessions. Note that the time granularity of SSL timestamps is in seconds, so this does not require very frequent barrier messages.

Figure 8:
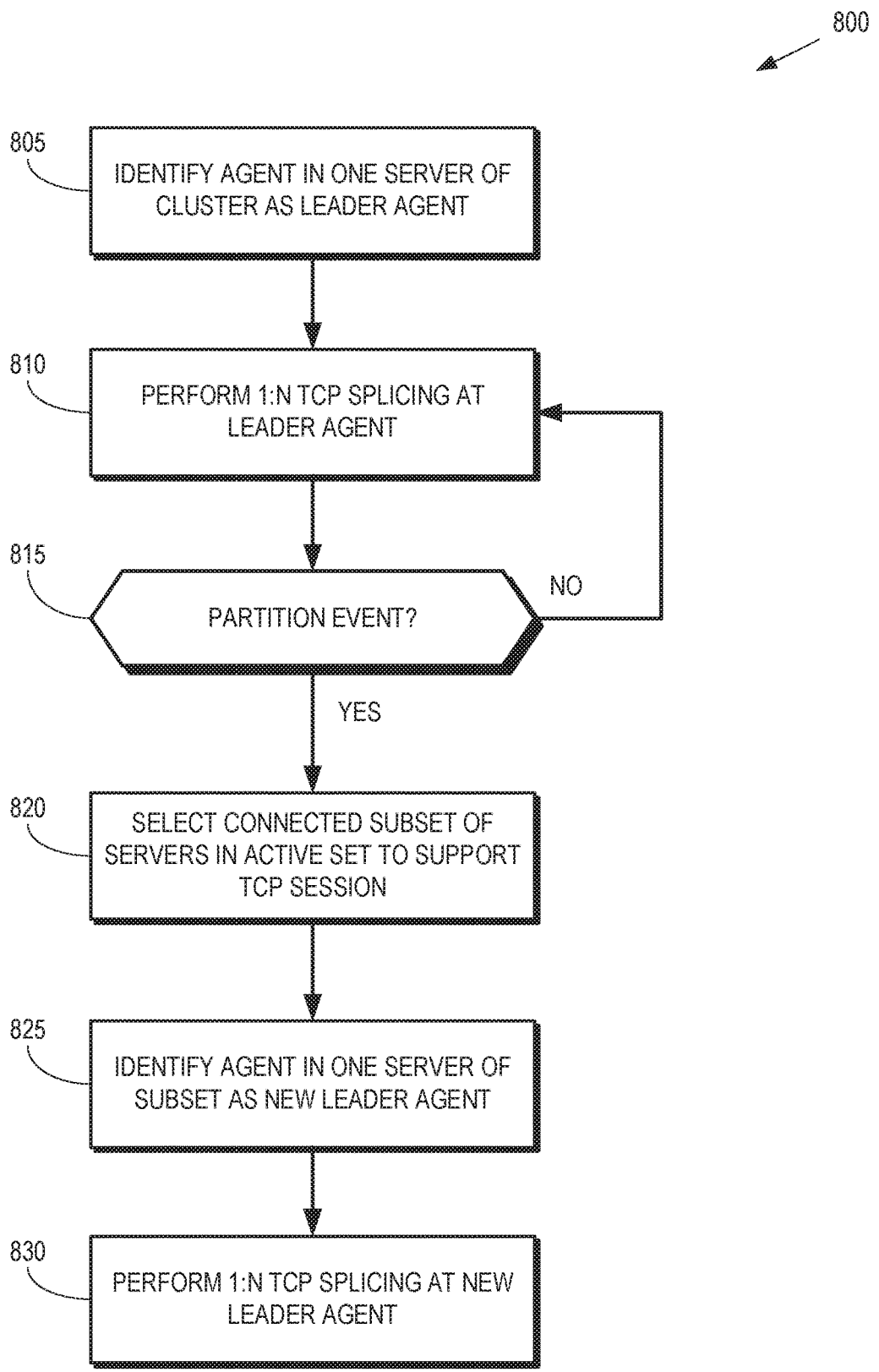
FIG. 8 is a flow diagram of a method of managing a cluster of servers that provide high-availability services to one or more clients according to some embodiments.

FIG. 8 is a flow diagram of a method 800 of managing a cluster of servers that provide high-availability services to one or more clients according to some embodiments. The method 800 is implemented in some embodiments of the communication systems 100, 200, 300, 400, 500, 600, 700 illustrated in FIGS. 1-7. As discussed herein, the servers in the cluster implement corresponding agents to handle packet replication, forwarding, and flow control four instances of a control plane application that are running on the servers.

At block 805, one of the agents in one of the servers is identified as a leader agent for the servers in the cluster. At block 810, the leader agent merges the multiple flows that convey packets to and from the other servers to support a single flow of uplink and downlink packets for a client. Some embodiments of the leader agent perform 1:N TCP splicing of the TCP flows between the servers and the client, as discussed herein.

At decision block 815, the servers in the cluster determine whether a partitioning event has occurred. Examples of partitioning events include a connection failure or a server failure that prevent servers in one subset of the cluster from exchanging heartbeat messages or other communication with servers in another subset of the cluster. As long as no partitioning event is detected, the method 800 flows back to block 810 and the leader agent continues to perform 1:N TCP splicing of the TCP flows between the servers and the client. If the servers detect a partitioning event, the method 800 flows to block 820.

At block 820, the servers run a primary partition selection algorithm in response to the partitioning event. As discussed herein, the primary partition selection algorithm can include a front-end probe algorithm, a simple majority algorithm, or a near majority algorithm. Based on the results of the primary partition selection algorithm, the servers converge on a subset of connected servers that are selected as the primary partition or active set to support the ongoing TCP session.

At block 825, the agents on the servers in the primary partition run a leader election algorithm to identify one of the agents as a new leader agent on a primary server. In some embodiments, the leader agent is the agent that has the highest routing metric from among the agents on the servers in the primary partition. The new leader agent can be the same as the old leader agent if the old leader agent is on a server that is included in the newly selected primary partition. At block 830, the new leader agent merges the multiple flows that convey packets to and from the other servers to support a single flow of uplink and downlink packets for a client. Some embodiments of the new leader agent perform 1:N TCP splicing of the TCP flows between the servers and the client, as discussed herein.

Figure 9:
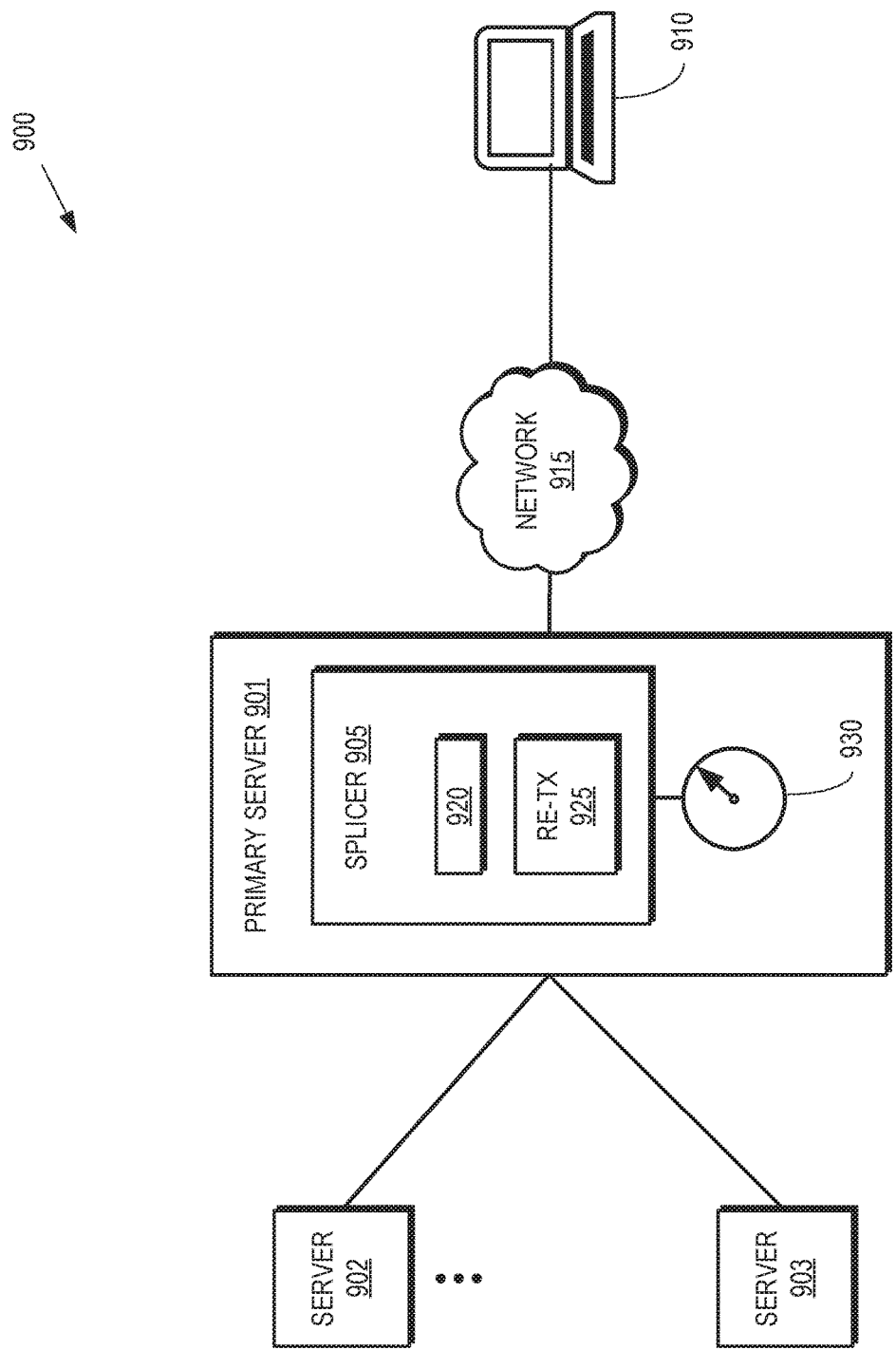
FIG. 9 is a block diagram of a communication system that supports packet retransmission while providing high-availability services according to some embodiments.

FIG. 9 is a block diagram of a communication system 900 that supports packet retransmission while providing high-availability services according to some embodiments. The communication system 900 represents some portions of the embodiments of the communication systems 100, 200, 300, 400, 500, 600, 700 illustrated in FIGS. 1-7. The communication system 900 includes a cluster of servers 901, 902, 903, which are collectively referred to herein as "the servers 901-903." As discussed herein, each of the servers 901-903 includes an agent to support high availability services provided by instances of a control plane application that are concurrently running on the corresponding servers 901-903. The servers 901-903 are interconnected by one or more backend switches (not shown in FIG. 9 in the interest of clarity) that provide pathways for conveying packets or signaling between the servers 901-903.

In the illustrated embodiment, the server 901 acts as a primary server and the servers 901 and 902 are secondary servers. The primary server 901 includes a splicer 905 that receives incoming uplink packets for the servers 901-903 and replicates the uplink packets for distribution to the servers 901 and 902. The splicer 905 also receives outgoing downlink packets from the servers 901 and 902 and merges the downlink packets with downlink packets generated by the primary server 901 into a single stream for transmission to a client 910 via a network 915. In the illustrated embodiment, the servers 901-903 share the same virtual IP address. The client 910 accesses the cluster of servers 901-903 by connecting to the virtual IP address. The connection between the client 910 and the cluster of servers 901-903 identified by the virtual IP address is formed is a stateful connection such as a stateful transmission control protocol (TCP) connection. The splicer 905 is implemented as an agent running on one of the primary server 901. For example, the splicer 905 can be implemented in the agent 211 running on the server 202 shown in FIG. 2. In some embodiments, the splicer 905 is replicated at other servers to avoid a single point of failure. Only the splicer 905 at the current primary server 901 remains active; a splicer instance at secondary servers 902, 903 becomes active if the corresponding server becomes the primary.

The splicer 905 implements a 1:N TCP splicing algorithm to ensure that the client 910 sees a single virtual server (represented by the virtual IP address) while also allowing packets to be generated by any of the servers 901-903 in the cluster. The servers 901-903 are therefore identical and replaceable. Addition and removal of one or more of the servers 901-903 from the cluster or active set is performed dynamically, as discussed herein. Some embodiments of the 1:N TCP splicing algorithm are implemented in three parts: sequence number translation, flow control, and retransmission handling.

Each of the servers 901-903 performs sequence number translation so that the packets generated by the servers 901-903 are identical. For example, when the IPv4 protocol is used, the servers 901-903 generate server-to-client packets independently and the sequence numbers for outgoing packets may be different across the different servers 901-903. Thus, before a packet leaves one of the servers 901-903, a kernel module at the server translates the sequence numbers to ensure consistency with the other servers 901-903. The kernel module than recomputes a TCP checksum using the new sequence number. Coordination between the servers 901-903 is performed to ensure consistency between the sequence numbers. In some embodiments, the primary server 901 is chosen as a centralized server to generate a sequence number for each packet and broadcast the sequence number to the other servers. Alternatively, a distributed algorithm is implemented in the servers 901-904, which then perform a distributed consensus protocol agree on sequence numbers for the packets. Similarly, in the case of IPv6, a 20-bit flow label in an IPv6 header of the packet is set independently by each server 901-904. The IPv6 flow label for outgoing packets is translated to the sequence number, e.g., using one of the aforementioned sequence number coordination techniques.

The splicer 905 performs flow control to ensure that none of the servers 901-904 is ahead of or behind the other servers. Thus, if one of the servers 901-904 misses an uplink packet, the server can request a retransmission directly from the client 910. The servers 901-904 are therefore not required to buffer uplink packets received from the client 910 and later redistribute the buffered packets to the other servers. Furthermore, any server that transmits data should not receive an acknowledgment from the client 910 unless all (or a predetermined number) of the servers 901-904 have transmitted the data. The packets generated by the servers 901-904 may not always have the same size because the TCP stacks in the servers 901-904 determine when to send out a packet depending on local timing and buffer conditions. Consequently, packets generated by the different servers 901-904 should not simply be mixed for transmission to the client 910. Instead, an agent in the primary server 901 keeps track of the number of bytes generated by the servers 901-904 based on their sequence numbers. For example, the splicer 905 maintains a data structure 920 to store the byte generation and transmission information.

Some embodiments of the data structure 920 store the following information:

bytes_gen for each server: this is the number of bytes generated by each server and forwarded to the primary server 901 so far.

bytes_sent: this is the number of bytes the primary server 901 has sent to the client 910 so far.

Note that bytes_sent equals the minimum of bytes_gen across the servers 901-903.

Table 1 shows a sequence of events that illustrates how the packets in data streams received from the servers 901-903 are merged and forwarded to the client 910. The example shown in Table 1 assumes that the cluster only includes two servers S1 and S2, which can correspond to the server 901 and the server 902.

TABLE 1

| Steps | Events | bytes_gen (S1) | bytes_gen (S2) | Action | bytes_sent |
|---|---|---|---|---|---|
| 0 | (Initial state) | 0 | 0 | | 0 |
| 1 | S1 sent 0-100 B | 100 | 0 | Drop | 0 |
| 2 | S2 sent 0-150 B | 100 | 150 | Send 0-100, drop rest | 100 |
| 3 | S1 sent 101-200 B | 200 | 150 | Send 101-150, drop rest | 150 |
| 4 | S2 sent 151-300 B | 200 | 300 | Send 151-200, drop rest | 200 |
| 5 | S1 sent 201-300 B | 300 | 300 | Send 201-300 | 300 |

At step 0, the system is in its initial state. No bytes have been generated by either of the servers S1 and S2.

At step 1, the server S1 has generated bytes 0-100 for transmission to the client. However, no bytes have been received from the server S2 so the bytes 0-100 generated by the server S1 are dropped.

At step 2, the server S2 has generated bytes 0-150 for transmission to the client. Thus, both servers S1 and S2 have generated bytes 0-100. The agent in the primary server therefore transmits the bytes 0-100 and drops the bytes 101-150. Table 1 is updated to indicate that the latest byte transmitted is byte 100.

At step 3, the server S1 has generated bytes 101-200 for transmission to the client. Thus, both servers S1 and S2 have generated bytes 0-150. The agent in the primary server therefore transmits the bytes 101-150 and drops the bytes 151-200. Table 1 is updated to indicate that the latest byte transmitted is byte 150.

At step 4, the server S2 has generated bytes 151-300 for transmission to the client. Thus, both servers S1 and S2 have generated bytes 0-200. The agent in the primary server therefore transmits the bytes 151-200 and drops the bytes 201-300. Table 1 is updated to indicate that the latest byte transmitted is byte 200.

At step 5, the server S1 has generated bytes 201-300 for transmission to the client. Thus, both servers S1 and S2 have generated bytes 0-300. The agent in the primary server therefore transmits the bytes 201-300. Table 1 is updated to indicate that the latest byte transmitted is byte 300.

The servers 901-903 transmit acknowledgements in response to successfully receiving packets from the client 910. The servers 901-903 also transmit requests to the client 910 for retransmission of packets that were unsuccessfully received. In some embodiments, the retransmission requests are transmitted as duplicate acknowledgments that include a sequence number of a previously received packet. For example, if the server 901 successfully receives a packet with the sequence number 1 and does not successfully receive a packet with the sequence number 2, the server 901 sends a duplicate acknowledgment message including the sequence number 1 in response to successfully receiving a packet with the sequence number 3. The client 910 interprets the duplicate acknowledgment as a request for retransmission of the packet including sequence number 2.

The different servers 901-903 may experience different packet losses and may therefore send different numbers of retransmission requests. The splicer 905 should therefore ensure that: (1) when any server loses a packet, it should be able to request a retransmission from the client 910, which is done by sending duplicate acknowledgments to the client; and (2) when multiple servers send duplicate acknowledgments, only one stream of duplicate acknowledgments should be seen by the client. Note that (1) ensures that packets need not be buffered at the servers 901-903 for redistribution, and (2) refrains from exacerbating the duplicate acknowledgment scenario for the client 910. Each time a duplicate acknowledgment is triggered, the splicer 905 keeps track of a number of duplicate acknowledgments sent by each server 901-903 and a maximum number of duplicate acknowledgments that can be sent by each server 901-903. The splicer 905 only sends duplicate acknowledgments to the client 910 up to this maximum number.

Table 2 shows an example of how acknowledgment packets are forwarded to the client 910, assuming the cluster contains two servers S1, S2.

TABLE 2

| Steps | Events | Action |
|---|---|---|
| 0 | (client->server packet with seq # 101 is lost) | |
| 1 | S1 sent ACK 100 ($1^{st}$ duplicate ACK from S1) | Send ACK 100 ($1^{st}$ duplicate ACK) |
| 2 | S2 sent ACK 100 ($1^{st}$ duplicate ACK from S2) | Drop |
| 3 | S2 sent ACK 100 ($2^{nd}$ duplicate ACK from S2) | Send ACK 100 ($2^{nd}$ duplicate ACK) |
| 4 | S1 sent ACK 100 ($2^{nd}$ duplicate ACK from S1) | Drop |

At step 0, the client transmits a packet that is lost by both of the servers S1 and S2.

At step 1, the server S1 sends an acknowledgment with the sequence number 100 that is the first duplicate acknowledgment sent from the server S1. The splicer 905 therefore sends the acknowledgment because it is the first duplicate acknowledgment with the sequence number 100.

At step 2, the server S2 sends an acknowledgment with the sequence number 100 that is the first duplicate acknowledgment sent from the server S2. The splicer 905 determines that this is the second attempt to send the first duplicate acknowledgment that includes the sequence number 100. The splicer 905 therefore drops the first duplicate acknowledgment sent from the server S2.

At step 3, the server S2 sends an acknowledgment with the sequence number 100 that is the second duplicate acknowledgment sent from the server S2. The splicer 905 determines that this is the first attempt to send the second duplicate acknowledgment that includes the sequence number 100. The splicer 905 therefore transmits the second duplicate acknowledgment received from the server S2.

At step 4, the server S1 sends an acknowledgment with the sequence number 100 that is the second duplicate acknowledgment sent from the server S1. The splicer 905 determines that this is the second attempt to send the second duplicate acknowledgment that includes the sequence number 100. The splicer 905 therefore drops the second duplicate acknowledgment received from the server S1.

The splicer 905 replicates and forwards retransmitted packets from the client 910 to the servers 901-903. However, the splicer 905 eliminates redundant copies of retransmitted data that has been requested by one or more of the servers 901-903 from the client 910. In the illustrated embodiment, the splicer 905 has access to a packet retransmission table 925 that stores information indicating the retransmitted uplink packets that have been received by the splicer 905 and forwarded to the servers 901-903. Each packet can include retransmitted data and new data and the packet retransmission table 925 stores information that identifies the "old" data that was previously received and "new" data that has not previously been received by the splicer 905. Thus, the old data is retransmitted data and the new data is newly received data.

Table 3 is an example of a packet retransmission table 925.

was byte 100. The duplicate acknowledgment is replicated to both of the servers S1 and S2 and so the servers S1 and S2 retransmit the requested data.

At step 2, the server S1 transmits the bytes 101-300, which include the retransmitted bytes 101-150 (old data) and the newly transmitted bytes 151-300 (new data). The splicer 905 transmits the old data (bytes 101-150) and drops the new data.

At step 3, the server S2 transmits the bytes 101-150, which include only the retransmitted bytes 101-150 (old data). The splicer 905 drops the bytes 101-150 transmitted by the server S2 because these bytes have already been retransmitted to the client 910.

At step 4, the server S2 transmits the bytes 151-300, which include newly transmitted bytes (new data). The splicer 905 has received the bytes 151-300 from both of the servers S1 and S2. The splicer 905 therefore transmits the new data including the bytes 151-300 to the client 910.

Some embodiments of the communication system 900 detect stalled servers and remove the stalled servers from the active set that is providing service to the client 910. One or more of the servers 901-903 may stall due to software or hardware issues, which slows down the entire cluster. The splicer 905 initiates a timer 930 in response to a predetermined number (e.g., at least half) of the servers 901-903 transmitting new data to the splicer 905. Any of the servers 901-903 that have not provided the new data prior to expiration of the timer 930 are removed from the active set. Although a single timer 930 is shown in the communication

TABLE 3

| Steps | Events | bytes_gen (S1) | bytes_gen (S2) | Action | bytes_sent |
|---|---|---|---|---|---|
| 0 | (Initial state) | 200 | 150 | | 150 |
| 1 | (received duplicate ACK 100 from client) | | | | |
| 2 | S1 sent 101-300 B (retransmission + new data) | 300 | 150 | Send 101-150 (old data), drop rest (new data) | 150 |
| 3 | S2 sent 101-150 B (retransmission only) | 300 | 150 | Drop (redundant retransmission) | 150 |
| 4 | S2 sent 151-300 B | 300 | 300 | Send 151-300 (new data) | 300 |

At step 0, the server S1 has generated bytes 1-200 and the server S2 has generated bytes 1-150. The splicer 905 has therefore transmitted bytes 1-150 to the client 910.

At step 1, the servers S1 and S2 receive a duplicate acknowledgment with the sequence number 100 from the client 910 indicating that the last successfully received byte system 900, some embodiments of the splicer 905 maintain more than one timer to monitor different servers or different TCP flows.

Table 4 shows an example of a data structure that includes information used to remove stalled servers. The servers S1, S2, and S3 correspond to the servers 901-903 shown in FIG. 9.

| Steps | Events | bytes_gen (S1) | bytes_gen (S2) | Bytes_gen (S3) | Action | bytes_sent |
|---|---|---|---|---|---|---|
| 0 | (Initial state) | 100 | 100 | 100 | | 100 |
| 1 | S1 sent 101-150 B | 150 | 100 | 100 | Drop | 100 |
| 2 | S2 sent 101-200 B | 150 | 200 | 100 | Drop; majority (2/3) servers have new data, so start timer | 100 |

-continued

| Steps | Events | bytes_gen (S1) | bytes_gen (S2) | Bytes_gen (S3) | Action | bytes_sent |
|---|---|---|---|---|---|---|
| 3 | S3 sent 101-200 B | 150 | 200 | 200 | Send 101-150, drop rest; Cancel timer | 150 |
| 4 | S1 sent 151-300 B | 300 | 200 | 200 | Send 151-200, drop rest | 200 |
| 5 | S3 sent 201-300 B | 300 | 200 | 300 | Drop; majority (2/3) servers have new data, so start timer | 200 |
| 6 | Timer expired | 300 | X | 300 | Remove S2 | 300 |

At step 0, the servers S1, S2, and S3 have generated the bytes 0-100, which have been sent to the client 910.

At step 1, the server S1 generates the bytes 101-150. Neither the server S2 nor the server S3 has generated bytes 101-150, so the splicer 905 drops the bytes 101-150.

At step 2, the server S2 generates the bytes 101-200. At this point, a majority (⅔) of the servers have provided the bytes 101-150 so the splicer 905 starts the timer 930. The splicer 905 drops the bytes 101-200.

At step 3, the server S3 generates the bytes 101-200 and the timer 930 has not yet expired. The splicer 905 transmits the bytes 101-150 and drops the bytes 151-200 because the server S1 has not yet generated these bytes.

At step 4, the server S1 generates the bytes 151-300. The splicer 905 transmits the bytes 151-200 and drops the bytes 201-300.

At step 5, the server S3 generates the bytes 201-300. At this point, a majority (⅔) of the servers have generated the bytes 201-300 and the splicer 905 starts the timer 930.

At step 6, the timer 930 expires and the server S2 has not generated the bytes 201-300. The splicer 905 therefore identifies the server S2 as a stalled server and removes the server S2 from the active set. The splicer 905 also transmits the bytes 201-300 to the client 910.

In some embodiments, no packets are forwarded to the client 910 in step 6 because packets are not buffered. The client 910 detects loss packets in this case and then sends duplicate acknowledgements to the servers 901-903 to trigger a retransmission of the lost packets.

The following pseudocode represents some embodiments of the 1:N splicing algorithm:

Data Structure

The following data structure is required for each TCP flow:

- For each server k:
    - bytes_gen[k]: the number of bytes the primary server has received from server k
    - last_ack[k]: the most recent ACK sequence number received from server k
    - last_seq[k]: the sequence number of the last packet received from server k
    - n_ack[k]: how many times has server k sent the last ACK
- bytes_sent: min(bytes_gen[k]; for k=1...n)
- min_seq: min(last_seq[k]; for k=1...n)
- min_ack: min(last_ack[k]; for k=1...n)
- max_n_ack: max(n_ack[k]; for k=1...n)
- retransmission_table: a table for retransmitted data packets, each entry contains
    - bytes_sent
    - n_sent[k], k=1...n; this is the number of retransmissions by each server k
    - max_n_sent: max(n_sent[k]; k=1...n)
- timer (to detect stalling servers)

Packet Handling Algorithm
Main Algorithm

- When a packet with (seq#, packet-len, ack#) from server k arrives the primary server
- New_bytes_gen = seq# + packet-len
- If packet_len > 0 /* this is a data packet */
    - If seq# > bytes_gen[k] /* this is a new data packet */
        - Call process_new_data
    - Else if new_bytes_gen <= bytes_gen[k] /* this is retransmission */
        - Call process_retransmission
    - Else /* this contains both retransmitted data and new data */
        - Split the packet data into two packets and update checksum:
            - Old_data = [seq#, bytes_gen[k]]
            - New_data = [bytes_gen[k], new_bytes_gen]
        - Call process_retransmission for packet old_data
        - Call process_new_data for packet new_data
- Else if (this is a SYN or FIN)
    - Call process_control_packet
- Else /* this is ACK */
    - If ack# > last_ack[k] /* this is a new ack */
        - Last_ack[k] = ack#
        - n_ack[k] = 1
        - new_min_ack = min(last_ack[k]; for k=1...n)
        - If new_min_ack > min_ack
            - Min_ack = new_min_ack
            - max_n_ack = max (n_ack[k]; for all k where n_ack[k] == min_ack)
            - send max_n_ack ACK packets to client
    - else if ack# == last_ack[k] /* this is a duplicate ack */
        - n_ack[k] ++
        - If ack# == min_ack and n_ack[k] > max_n_ack
            - Send this ACK packet to client
            - max_n_ack = n_ack[k]

Process_New_Data

- Bytes_gen[k] = new_bytes_gen
- Min_bytes_gen = min(bytes_gen[k]; k=1...n)
- If (min_bytes_gen > bytes_sent)
    - Send new data to client
    - Bytes_sent = min_bytes_gen
    - Cancel timer
- If no timer is started
    - m = number of servers where bytes_gen[k] > bytes_sent
    - If m >= n/2, start timer Process_Timer_Expiration

- For all server k
    - If bytes_gen[k] == bytes_sent
        - Remove server k from cluster Process_Retransmission

- Look up retransmission table using new_bytes_gen
- If no netry found for this data
    - Create entry in retransmission_table
- Else for the entry found
    - n_sent[k] ++
    - new_max_n_sent = max(n_sent[k]; k=1...n)
    - if(new_max_n_sent > max_n_sent)
        - send this packet to client
        - max_n_sent = new_max_n_sent Process_Control_Packet ---
- last_seq[k] = seq_number of the packet
- cur_min_seq = min(last_seq[k]; k=1...n)
- If (cur_min_seq > min_seq)
  - Send control packet to client
  - min_seq = cur_min_seq
---

Note that if duplicate acknowledgment from a server k has ack#>min_ack, this means this server is ahead of the other servers in the cluster. This duplicate acknowledgment is then delayed until other servers catch up. The array n_ack[k] is used to keep track of how many acknowledgments need to be sent later in this case.

Figure 10:
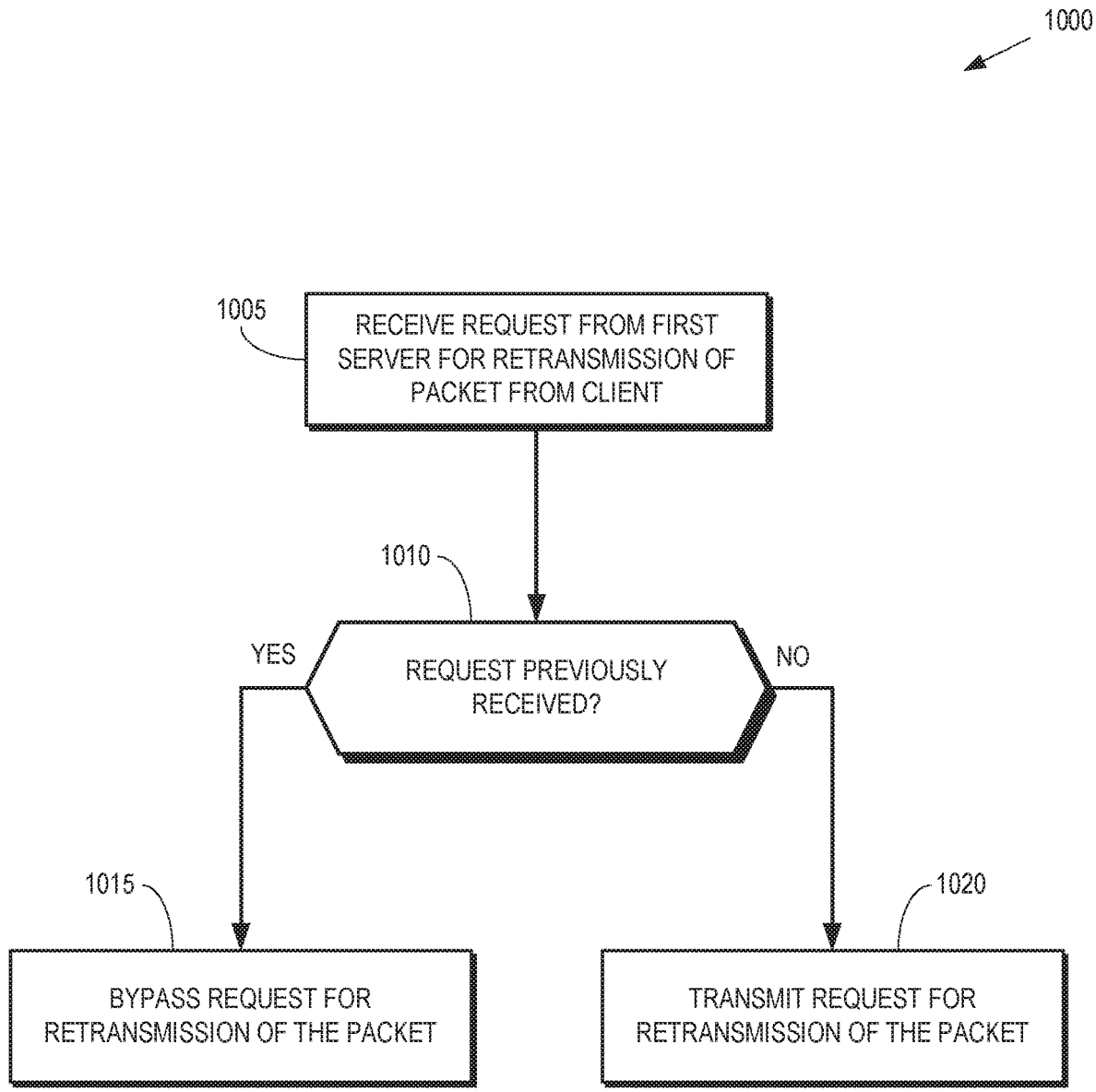
FIG. 10 is a flow diagram of a method of selectively forwarding a request for retransmission of a packet transmitted by a client to a cluster of servers according to some embodiments.

FIG. 10 is a flow diagram of a method 1000 of selectively forwarding a request for retransmission of a packet transmitted by a client to a cluster of servers according to some embodiments. The method 1000 is implemented in some embodiments of the communication systems 100, 200, 300, 400, 500, 600, 700 illustrated in FIGS. 1-7. The method 1000 is implemented in some embodiments of the splicer 905 in the communication system 900 shown in FIG. 9.

At block 1005, the splicer receives a request for retransmission of an uplink packet that was received from a client. In some embodiments, the splicer previously received the uplink packet and replicated it to the servers in the cluster but one or more of the copies of the packet were lost or otherwise unsuccessfully received by one or more of the servers. In other cases, the splicer did not successfully receive the uplink packet.

At decision block 1010, the splicer determines whether the request for retransmission of the unsuccessfully received uplink packet was previously received from another server. For example, the splicer can determine that another server sent a duplicate acknowledgment with the same sequence number. If so, the method 1000 flows to block 1015. If not, the method 1000 flows to block 1020.

At block 1015, the splicer bypasses transmitting the request for retransmission of the uplink packet to the client because a request for retransmission of the same uplink packet was previously transmitted to the client in response to receiving the request from another server.

At block 1020, the splicer transmits the request for retransmission of the uplink packet to the client because a request for retransmission of the same uplink packet was not previously transmitted to the client in response to receiving the request from another server.

Figure 11:
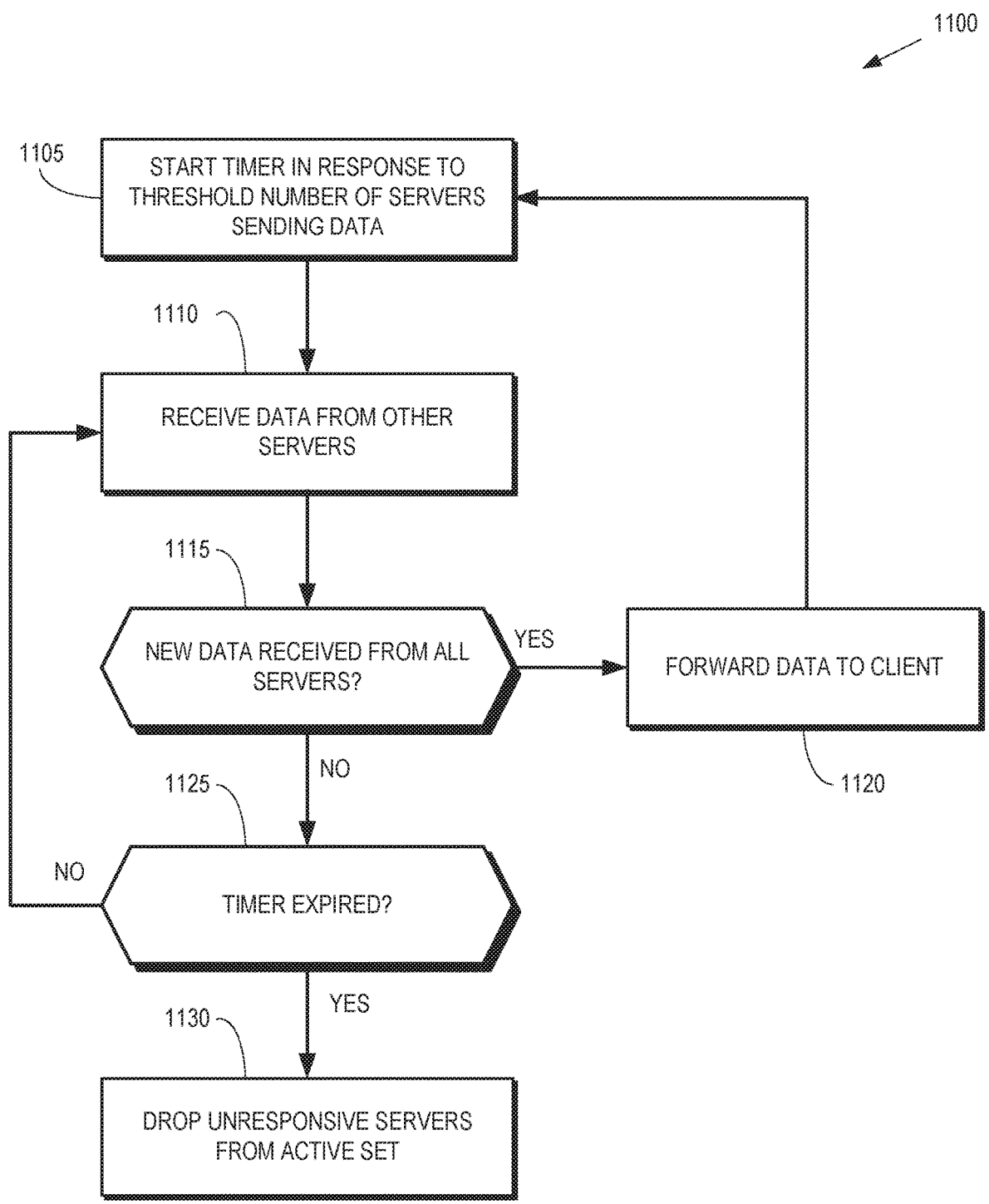
FIG. 11 is a flow diagram of a method of selectively retransmitting packets received from a cluster of servers to a client according to some embodiments.

FIG. 11 is a flow diagram of a method 1100 of selectively retransmitting packets received from a cluster of servers to a client according to some embodiments. The method 1100 is implemented in some embodiments of the communication systems 100, 200, 300, 400, 500, 600, 700 illustrated in FIGS. 1-7. The method 1100 is implemented in some embodiments of the splicer 905 in the communication system 900 shown in FIG. 9.

At block 1105, the splicer starts the timer in response to receiving new data from a threshold number of servers in the server cluster. For example, the splicer can start the timer in response to receiving new data from at least half of the servers in the server cluster. At block 1110, the splicer may receive data from one or more other servers, although this does not necessarily occur in all cases.

At block 1115, the splicer determines whether the new data has been received from all the servers in the cluster. If so, the method 1100 flows to block 1120 and the splicer forwards the new data to the client. The method 1100 can then flow back to block 1105. If new data has not been received from all the servers in the cluster, the method 1100 flows to decision block 1125.

At decision block 1125, the splicer determines whether the timer is expired. If not, the method 1100 flows back to block 1110 and the splicer continues to wait to receive new data from one or more other servers. If the splicer determines that the timer has expired, the method 1100 flows to block 1130 and the splicer drops the unresponsive servers from the active set.

Some embodiments of the communication systems, architectures, and techniques disclosed herein support feature-rich data plane functionalities and enable new classes of applications that are more dynamic and reliably create and provision network services in real-time. For example, on demand network slices can be provisioned and decommissioned in large numbers, new paths and traffic classifications can be computed and introduced in the network dynamically, large number of packet processing rules can be introduced and removed at the routers in real-time, etc. Instead of purpose-building solutions for every new control plane application with its own security, availability and reliability features, some embodiments of the communication system disclosed herein provide a general-purpose control plane framework that supports software building blocks to design and build any network control plane application and encourages new innovations. Thus, the "always available" network control plane framework disclosed herein has the following features:

Be highly available and reliable for any application in a protocol-agnostic fashion, Recovers from any software or hardware failure with sub-second latency, Provides secure access mechanisms across applications and network states, Supports seamless (version) upgrade for any application with zero downtime.

Some embodiments of the generalized high availability network control plane platform disclosed herein support the design and development of control plane applications and are amenable for innovations resulting from future control plane research. The high availability network control plane platform can be implemented in distributed systems to develop the high availability platform on replicated hardware and provides the building blocks for developing new control plane applications. The high-availability network control plane platform also provides the following features:

It supports fine-grained transport layer (stateful) TCP sessions with real-time fast failure recovery that can be used by any application to build on to.

It hides the heterogeneity in both hardware and software platforms from the applications and enables a common software upgrade mechanism that can be used by all applications.

It provides a generalized data security mechanism that can be replicated across redundant platforms and can be used by different encryption schemes used by various protocols and applications.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   instantiating a plurality of agents on a corresponding plurality of servers that are running concurrent instances of a control plane application;
   selecting a first agent from the plurality of agents to mediate communication between a client and the concurrent instances of the control plane application running on the plurality of servers;
   replicating, at the first agent, uplink packets received from the client for transmission to the plurality of agents, wherein a first connection is used to convey the uplink packets; and
   transmitting, from the first agent, a single copy of redundant downlink packets received from the plurality of agents to the client via the first connection.

2. The method of claim 1, wherein selecting the first agent comprises running instances of an election algorithm on the plurality of agents, wherein the election algorithm selects one of the plurality of agents as the first agent based on availability of resources at the plurality of agents.

3. The method of claim 2, wherein the plurality of agents is configured to exchange packets or heartbeat messages between the plurality of agents via at least one backend switch connected to interfaces at the plurality of servers.

4. The method of claim 3, wherein the election algorithm selects the first agent based on at least one of a router interface status, an application service status, a number of neighboring servers, a number of active backplane interface ports, and a tie-breaking index.

5. The method of claim 3, further comprising:
   detecting a partitioning event that indicates that a first subset of the plurality of agents is not connected to a second subset of the plurality of agents via the at least one backend switch.

6. The method of claim 5, wherein detecting the partitioning event comprises detecting failure of at least one of the plurality of servers or a link between one of the plurality of servers and the at least one backend switch.

7. The method of claim 5, wherein detecting the partitioning event comprises detecting the partitioning event based on the heartbeat messages transmitted by the plurality of servers via the at least one backend switch at predetermined time intervals.

8. The method of claim 5, further comprising:
   selecting the first subset or the second subset to continue to support the first connection with the client;
   selecting an agent within the selected first or second subset to mediate communication between the client and the concurrent instances of the control plane application running in the selected first or second subset; and
   interrupting communication between the client and instances of the control plane application running in the unselected first or second subset.

9. The method of claim 1, further comprising:
   receiving, at the first agent from a new server, a request for a state of the control plane application;
   transmitting, from the new server, the state of the control plane application, wherein the new server clones the control plane application process based on the state; and
   adding the new server to the plurality of servers that are running concurrent instances of the control plane application.

10. The method of claim 1, wherein the first connection is a stateful connection between the client and the first agent.

11. The method of claim 10, wherein the first connection is a stateful transmission control protocol (TCP) connection, wherein replicating the uplink packets comprises replicating the uplink packets received in a single TCP stream.

12. The method of claim 11, wherein transmitting the single copy of the redundant downlink packets comprises merging the redundant downlink packets into the single TCP stream for transmission over the stateful TCP connection.

13. A server comprising:
a processor configured to instantiate a first agent and a first instance of a control plane application, wherein the first instance is one of a plurality of instances of the control plane application that are running concurrently on a plurality of servers that comprises the server, wherein the plurality of servers instantiate a plurality of agents that comprises the first agent, and wherein the first agent is selected to mediate communication between a client and the concurrent instances of the control plane application running on the plurality of servers,
and wherein the first agent is configured to replicate uplink packets received from the client for transmission to the plurality of agents via a first connection; and
a transmitter configured to transmit, from the first agent via the first connection, a single copy of redundant downlink packets received from the plurality of agents for transmission to the client.

14. The server of claim 13, wherein the processor is configured to run an instance of an election algorithm that selects one of the plurality of agents to mediate communication between the client and the concurrent instances of the control plane application based on availability of resources at the plurality of agents.

15. The server of claim 14, wherein the server is connected to at least one backend switch that is connected to interfaces at the plurality of servers, wherein the plurality of agents is configured to exchange packets or signaling between the plurality of agents via the at least one backend switch.

16. The server of claim 15, wherein the election algorithm selects the first agent based on at least one of a router interface status, an application service status, a number of neighboring servers, a number of active backplane interface ports, and a tie-breaking index.

17. The server of claim 15, wherein the processor is configured to detect a partitioning event that indicates that a first subset of the plurality of agents is not connected to a second subset of the plurality of agents via the at least one backend switch.

18. The server of claim 17, wherein the processor is configured to detect failure of at least one of the plurality of servers or a link between one of the plurality of servers and the at least one backend switch.

19. The server of claim 17, wherein the processor is configured to detect the partitioning event based on heartbeat messages transmitted by the plurality of servers via the at least one backend switch at predetermined time intervals.

20. The server of claim 17, wherein the server is in the first subset, wherein the first subset is selected to continue to support the first connection with the client, wherein the first agent is selected to mediate communication between the client and the concurrent instances of the control plane application running in the first subset, and wherein communication is interrupted between the client and instances of the control plane application running in the second subset.

21. The server of claim 13, further comprising:
a receiver configured to receive, from a new server, a request for a state of the control plane application, and wherein the transmitter is configured to transmit the state of the control plane application,
wherein the new server clones the control plane application based on the state, and
wherein the new server is added to the plurality of servers that are running concurrent instances of the control plane application.

22. The server of claim 13, wherein the first connection is a stateful connection between the client and the first agent.

23. The server of claim 22, wherein the first connection is a stateful transmission control protocol (TCP) connection, and wherein the processor replicates the uplink packets received in a single TCP stream.

24. The server of claim 23, wherein the processor merges the redundant downlink packets into the single TCP stream for transmission over the stateful TCP connection.

25. A system comprising:
a plurality of servers configured to instantiate a plurality of agents and run concurrent instances of a control plane application;
wherein the plurality of agents selects a first agent from the plurality of agents to mediate communication between a client and the concurrent instances of the control plane application running on the plurality of servers;
wherein the first agent replicates uplink packets received from the client for transmission to the plurality of agents, wherein a first connection is used to convey the uplink packets; and
wherein the first agent transmits, via the first connection, a single copy of redundant downlink packets received from the plurality of agents for transmission to the client.

26. The system of claim 25, further comprising:
at least one backend switch connected to interfaces at the plurality of servers, wherein the plurality of agents is configured to exchange packets or signaling between the plurality of agents via the at least one backend switch.

27. The system of claim 26, wherein the plurality of servers is configured to detect a partitioning event that indicates that a first subset of the plurality of agents is not connected to a second subset of the plurality of agents via the at least one backend switch.

28. The system of claim 27, wherein the plurality of servers is configured to detect failure of at least one of the plurality of servers or a link between one of the plurality of servers and the at least one backend switch.

29. The system of claim 27, wherein the plurality of servers is configured to detect the partitioning event based on heartbeat messages transmitted by the plurality of servers via the at least one backend switch at predetermined time intervals.

30. The system of claim 27, wherein the plurality of servers is configured to:
select the first subset or the second subset to continue to support the first connection with the client;
select an agent within the selected first or second subset to mediate communication between the client and the concurrent instances of the control plane application running in the selected first or second subset; and
interrupt communication between the client and instances of the control plane application running in the unselected first or second subset.

31. The system of claim 25, wherein the first agent is configured to:
receive, from a new server, a request for a state of the control plane application;
transmit the state of the control plane application, wherein the new server clones the control plane application on the state; and add the new server to the plurality of servers that are running concurrent instances of the control plane application.

32. The system of claim 25, wherein the first connection is a stateful transmission control protocol (TCP) connection and the first agent replicates the uplink packets received in a single TCP stream, and wherein the first agent merges the redundant downlink packets into the single TCP stream for transmission over the stateful TCP connection.

* * * * *